US00RE44082E

(19) United States
(12) Reissued Patent
Shafer et al.

(10) Patent Number: US RE44,082 E
(45) Date of Reissued Patent: Mar. 19, 2013

(54) FUEL INJECTOR HAVING DUAL MODE CAPABILITIES AND ENGINE USING SAME

(75) Inventors: Scott F. Shafer, Morton, IL (US); Clifford E. Cotton, III, Bradford, IL (US); Ye Tian, Bloomington, IL (US); Richard H. Holtman, Dunlap, IL (US); Joseph Angelino, Poquoson, VA (US); Robert E. Dieffenbach, Princeville, IL (US)

(73) Assignee: Caterpillar Inc., Peoria, IL (US)

(21) Appl. No.: 11/412,251

(22) Filed: Apr. 26, 2006
(Under 37 CFR 1.47)

Related U.S. Patent Documents

Reissue of:
(64) Patent No.: 6,725,838
Issued: Apr. 27, 2004
Appl. No.: 10/207,193
Filed: Jul. 29, 2002

U.S. Applications:
(60) Provisional application No. 60/327,984, filed on Oct. 9, 2001.

(51) Int. Cl.
*F02B 3/00* (2006.01)
*F02B 5/00* (2006.01)

(52) U.S. Cl. ..... 123/446; 123/299; 123/305

(58) Field of Classification Search ..... 123/295, 123/299, 300, 305; 239/86–95, 533.1–533.9
See application file for complete search history.

(56) References Cited

U.S. PATENT DOCUMENTS

| | | | | |
|---|---|---|---|---|
| 2,898,051 | A | | 8/1959 | Teichert |
| 3,425,635 | A | | 2/1969 | Guertier |
| 3,633,823 | A | | 1/1972 | Steiger |
| 3,640,466 | A | | 2/1972 | Steiger |
| 4,006,859 | A | | 2/1977 | Thoma |
| 4,156,560 | A | | 5/1979 | Cheklich et al. |
| 4,200,231 | A | | 4/1980 | Knape |
| 4,202,500 | A | * | 5/1980 | Keiczek ..... 239/533.3 |
| 4,215,821 | A | * | 8/1980 | Eblen ..... 239/533.4 |
| 4,266,727 | A | * | 5/1981 | Happel et al. ..... 239/409 |
| 4,269,360 | A | | 5/1981 | Kopse |
| 4,284,043 | A | | 8/1981 | Happel |
| 4,448,168 | A | | 5/1984 | Komada et al. |
| 4,546,739 | A | | 10/1985 | Nakajima et al. |
| 4,595,144 | A | | 6/1986 | Wiegand et al. |
| 4,628,881 | A | | 12/1986 | Beck et al. |
| 4,758,169 | A | | 7/1988 | Steiger |
| 4,790,270 | A | | 12/1988 | McKay et al. |

(Continued)

FOREIGN PATENT DOCUMENTS

| | | |
|---|---|---|
| DE | 3824467 A1 | 1/1990 |
| DE | 3824467 C2 | 1/1990 |

(Continued)

OTHER PUBLICATIONS

Patent Abstracts of Japan; Publication No. 11280609; Injection Amount Variable Nozzle; Oct. 15, 1999; 1 page; Japan.

(Continued)

*Primary Examiner* — Thomas N Moulis
(74) *Attorney, Agent, or Firm* — Liell & McNeil

(57) ABSTRACT

A solitary fuel injector for a diesel engine that is capable of injecting fuel for a homogeneous charge compression ignition injection event, a conventional injection event. The solitary fuel injector also has a mixed mode that includes a homogeneous charge compression ignition injection and a conventional injection in a single compression stroke for the engine.

70 Claims, 14 Drawing Sheets

U.S. PATENT DOCUMENTS

| | | | | |
|---|---|---|---|---|
| 4,796,577 | A | 1/1989 | Baranescu | |
| 4,856,713 | A | 8/1989 | Burnett | |
| 4,958,605 | A | 9/1990 | O'Neal et al. | |
| 4,984,738 | A | 1/1991 | Winquist | |
| 4,987,887 | A | 1/1991 | Kelly | |
| 5,058,549 | A | 10/1991 | Hashimoto et al. | |
| 5,078,107 | A | 1/1992 | Morikawa | |
| 5,086,737 | A | 2/1992 | Watanabe et al. | |
| 5,163,621 | A | 11/1992 | Kato et al. | |
| 5,211,340 | A | 5/1993 | Yoshizu | |
| 5,241,935 | A | 9/1993 | Beck et al. | |
| 5,315,973 | A | 5/1994 | Hill et al. | |
| 5,458,292 | A | 10/1995 | Hapeman | |
| 5,497,743 | A | 3/1996 | Clarke | |
| 5,647,316 | A | 7/1997 | Hellen et al. | |
| 5,669,355 | A | 9/1997 | Gibson et al. | |
| 5,709,194 | A | 1/1998 | Moncelle | |
| 5,740,775 | A | 4/1998 | Suzuki et al. | |
| 5,769,060 | A | 6/1998 | Matsumoto | |
| 5,775,289 | A | 7/1998 | Yoshida et al. | |
| 5,875,743 | A | 3/1999 | Dickey | |
| 5,899,389 | A * | 5/1999 | Pataki et al. | 239/533.2 |
| 5,996,558 | A | 12/1999 | Ouellette et al. | |
| 6,019,091 | A | 2/2000 | Spoolstra | |
| 6,119,960 | A | 9/2000 | Graves | |
| 6,220,528 | B1 | 4/2001 | Cooke et al. | |
| 6,279,840 | B1 * | 8/2001 | Buckley | 239/533.4 |
| 6,298,822 | B1 | 10/2001 | Radue | |
| 6,338,445 | B1 | 1/2002 | Lambert et al. | |
| 6,340,121 | B1 * | 1/2002 | Lambert | 239/533.4 |
| 6,378,503 | B1 | 4/2002 | Lambert | |
| 6,422,199 | B1 | 7/2002 | Buckley et al. | |
| 6,516,774 | B2 | 2/2003 | Zur Loye et al. | |
| 6,557,532 | B1 | 5/2003 | Nakayama et al. | |
| 6,557,779 | B2 * | 5/2003 | Perr et al. | 239/96 |
| 6,561,157 | B2 | 5/2003 | Zur Loye et al. | |
| 6,601,566 | B2 * | 8/2003 | Gillis et al. | 123/468 |
| 6,637,675 | B2 * | 10/2003 | Carroll et al. | 239/533.4 |
| 6,659,071 | B2 | 12/2003 | LaPointe et al. | |
| 6,684,852 | B2 | 2/2004 | Wright et al. | |
| 6,705,543 | B2 * | 3/2004 | Carroll et al. | 239/96 |
| 6,769,634 | B2 * | 8/2004 | Brenk et al. | 239/533.3 |
| 6,769,635 | B2 * | 8/2004 | Stewart et al. | 239/558 |
| 6,843,434 | B2 * | 1/2005 | Lawrence et al. | 239/533.2 |
| 6,886,762 | B2 * | 5/2005 | Angelino et al. | 239/596 |
| 6,918,377 | B2 * | 7/2005 | Boltz | 123/467 |
| 6,945,475 | B2 * | 9/2005 | Lawrence et al. | 239/533.2 |
| 6,978,760 | B2 * | 12/2005 | Stewart et al. | 123/299 |
| 2004/0055559 | A1 | 3/2004 | Best | |

FOREIGN PATENT DOCUMENTS

| | | | |
|---|---|---|---|
| EP | 0 470 348 | A1 | 2/1992 |
| EP | 0905360 | | 3/1999 |
| EP | 1 041 272 | A2 | 3/2000 |
| EP | 1045136 | | 10/2000 |
| EP | 1069308 | A2 | 1/2001 |
| EP | 1108877 | | 6/2001 |
| JP | 63158962 | | 7/1988 |
| JP | 2002296681 | | 2/1997 |
| JP | 968133 | | 3/1997 |
| JP | 09236067 | | 9/1997 |
| JP | 11280609 | | 10/1999 |
| JP | 11351091 | | 12/1999 |
| JP | 200045848 | | 2/2000 |
| JP | 200073905 | | 3/2000 |
| JP | 2000303936 | | 10/2000 |
| JP | 2000337226 | | 12/2000 |
| JP | 2001159382 | | 6/2001 |
| JP | 2001214830 | | 8/2001 |
| JP | 2001241370 | | 9/2001 |
| WO | WO98/07973 | | 2/1998 |
| WO | WO 98/07973 | | 2/1998 |
| WO | WO 98/10179 | | 3/1998 |
| WO | WO98/10179 | | 3/1998 |
| WO | WO 99/42718 | * | 8/1999 |
| WO | 00/15956 | | 3/2000 |
| WO | 00/34647 | | 6/2000 |
| WO | 02/18775 | | 3/2002 |

OTHER PUBLICATIONS

Patent Abstracts of Japan; Publication No. 200303936; Fuel Injector Nozzle; Oct. 31, 2000; 1 page; Japan.

DW Gill, G Heimel, and P Herzog; AVariable Nozzle Concept for High-Speed DI Diesel Engines; pp. 163-181; Place, Title and Date of Publication unknown.

Quentin A. Baker; Expanding Diesel Engine Cetane Limits Through Staged Injection; 1983; pp. 1-15; SAE 830246; Society of Automotive Engineers, Inc., USA.

Rudolph H. Stanglmaier and Charles E. Roberts; Homogeneous Charge Compression Ignition (HCCI) Benefits, Compromises, and Future Engine Applications; SAE 1999-01-3682; 1999 Society of Automotive Engineers, Inc., pp. 1-8, USA.

* cited by examiner

FUEL INJECTOR HAVING DUAL MODE CAPABILITIES AND ENGINE USING SAME

Matter enclosed in heavy brackets [ ] appears in the original patent but forms no part of this reissue specification; matter printed in italics indicates the additions made by reissue.

Relation to other patent application

This application claims priority to provisional application No. 60/327,984, filed Oct. 9, 2001, with the same title.

TECHNICAL FIELD

This invention relates generally to nozzle assemblies, and more particularly to fuel injectors having dual mode capabilities.

BACKGROUND ART

In an effort to reduce emissions and to comply with more strict clean air standards, manufacturers of various diesel engine components have begun exploring alternative engine strategies. One such strategy that appears to have promise is the alteration of the manner in which fuel is injected. For instance, in a traditional diesel engine, fuel injection is timed to occur when the cylinder piston is near a top dead center position for its compression stroke. When the fuel and air reach an auto-ignition point, combustion occurs. This can be virtually instantaneous or after some ignition delay.

Engineers have learned that it is possible to reduce engine emissions if a small amount of fuel is injected while the cylinder piston is at the beginning of the compression stroke. In other words, when the piston is closer to a bottom dead center position than the top dead center position for the compression stroke. The injected fuel mixes with the air as it is being compressed to form a relatively homogeneous mixture that combusts when the piston is near its top dead center position. This mode of operation is typically referred to as homogeneous charge compression ignition. Because the fuel mixture is relatively homogeneous when combustion occurs, fewer emissions are produced during this type of injection event than a typical injection event. In other words, uniform air/fuel distribution and associated lower combustion temperatures contribute to significant $NO_x$, and particulate reductions.

One example of an engine utilizing the homogeneous charge compression ignition is described in U.S. Pat. No. 5,875,743, which issued to Dickey on Mar. 2, 1999 and is entitled Apparatus and Method For Reducing Emissions in a Dual Combustion Mode Diesel Engine. The apparatus disclosed by Dickey includes a port diesel fuel injector that is capable of delivering fuel to an engine cylinder for a homogeneous charge compression ignition injection event in addition to a fuel injector positioned to perform a more traditional injection event. While the fuel injection system of Dickey is capable of reducing emissions, there is still room for improvement.

For instance, engineers have determined that a reduction in the number of engine components can result in a more robust operating system. As indicated, the fuel injection system taught by Dickey includes multiple fuel injectors for the performance of two distinct injection events. However, it should be appreciated that the fuel injection system could be more robust if there was only a single fuel injector which had a limited number of components. In other words, a reduction in the number of fuel injectors, and/or fuel injector components, could make the system more robust because there would be less components that could fail or malfunction. In addition, in contradiction to the teachings of Dickey, engineers have learned that for certain engine load conditions, homogeneous charge compression ignition events may not be desirable.

The present invention is directed to overcoming one or more of the problems set forth above.

DISCLOSURE OF THE INVENTION

In one aspect of the present invention, a nozzle assembly includes a nozzle body that has a centerline and defines a plurality of nozzle outlets. A first portion of the plurality of nozzle outlets are oriented at a first angle with respect to the centerline. A second portion of the plurality of nozzle outlets are oriented at a second angle with respect to the centerline. A needle valve is positioned adjacent the plurality of nozzle outlets.

In another aspect of the present invention, an engine that has at least two modes of operation includes an engine housing defining a plurality of cylinders. A solitary fuel injector is provided for each of the cylinders and each has a tip at least partially positioned in one of the plurality of cylinders. The fuel injector has a first configuration for a homogeneous charge compression ignition mode of operation. The fuel injector has a second configuration for a conventional mode of operation.

BEST MODE FOR CARRYING OUT THE INVENTION

Figure 1A:
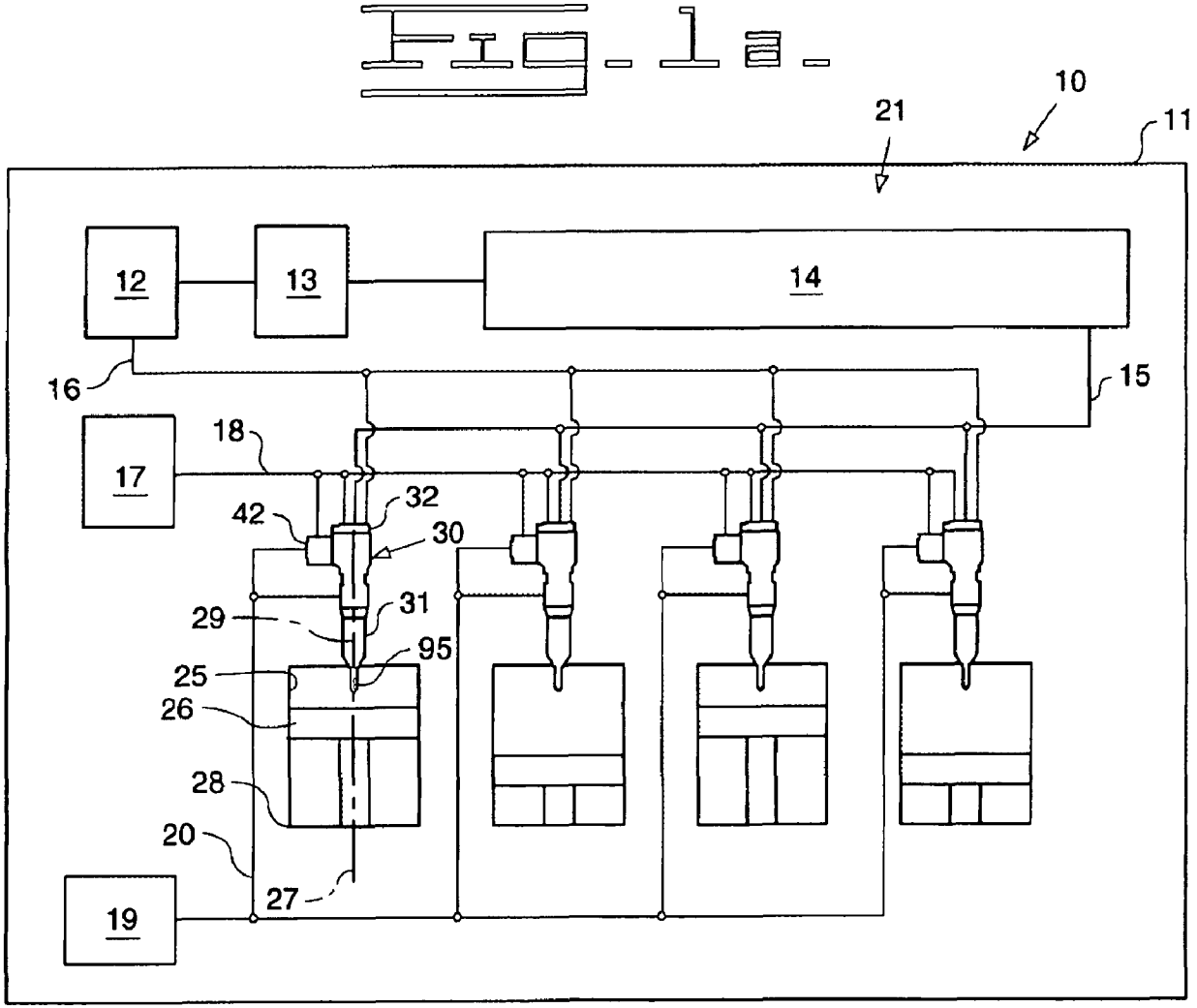
FIG. 1a is a schematic representation of an engine according to the present invention.

Referring now to FIG. 1a there is illustrated an engine 10 according to the present invention. Engine 10 provides a low pressure reservoir 12 that preferably includes an amount of engine lubricating oil. However, it should be appreciated that any suitable fluid could be contained therein, such as coolant, transmission fluid or fuel. A high pressure pump 13 pumps oil from low pressure reservoir 12 and delivers the same to high pressure manifold or common rail 14. High pressure oil flowing out of high pressure manifold 14 is delivered via high pressure fluid supply line 15 as part of a hydraulic system 21 provided in engine 10, and oil is returned to low pressure reservoir 12 via low pressure return line 16 after it has performed work in hydraulic system 21. Engine 10 also has an engine housing 11 that defines a plurality of cylinders 25.

Each of the cylinders 25 defined by engine housing 11 has a movable piston 26. Each piston 26 is movable between a bottom dead center (BDC) position and a top dead center (TDC) position. For a typical four cycle diesel engine 10, the advancing and retracting strokes of piston 26 correspond to the four stages of engine 10 operation. When piston 26 retracts from its top dead center position to its bottom dead center position for the first time, it is undergoing its intake stroke, and air can be drawn into cylinder 25 via an intake valve (not shown). When piston 26 advances from its bottom dead center position to its top dead center position for the first time it is undergoing its compression stroke and the contents of cylinder 25 are compressed. At an appropriate time during the compression stroke, fuel can be injected into cylinder 25 by a fuel injector 30, and combustion within cylinder 25 can occur in a conventional manner. This combustion drives piston 26 downward toward its bottom dead center position, for the power stroke of piston 26. Finally, when piston 26 once again advances from its bottom dead center position to its top dead center position, post combustion products remaining in cylinder 25 can be vented via an exhaust valve (not shown), corresponding to the exhaust stroke of piston 26. While engine 10 has been illustrated as a four cycle, four-cylinder engine, it should be appreciated that any desired number of cylinders could be defined by engine housing 11. In addition, engine 10 could be a two stroke engine or have the ability to operate in both two stroke and four stroke modes.

Returning to engine 10, a solitary fuel injector 30 is provided for each cylinder 25 and is positioned such that a tip portion 95 is at least partially positioned in cylinder 25 as in a typical diesel engine. Fuel injector 30 is fluidly connected to a fuel tank 19 via a fuel supply line 20 and delivers fuel to cylinder 25 for combustion. Fuel injector 30 has a fuel injector centerline 29. Attached to fuel injector 30 are a first electrical actuator 32 and a second electrical actuator 42. Together, first electrical actuator 32 and second electrical actuator 42 control fuel pressurization within fuel injector 30 and the timing of injection events. Activators 32 and 42 are controlled in their respective energizations by an electronic control module 17 in a conventional manner, via communication line(s) 18.

Figure 1E:
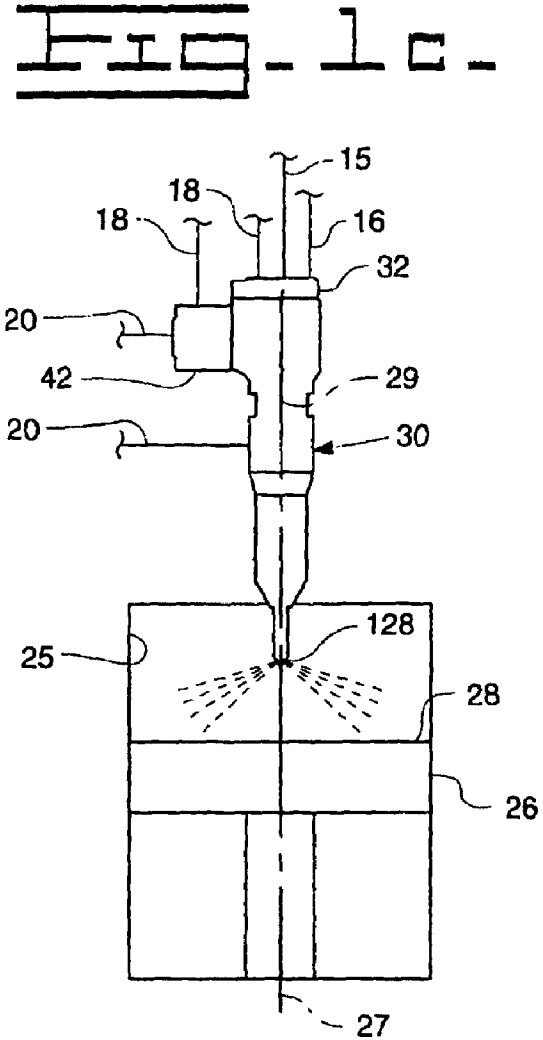
FIG. 1b is a diagrammatic representation of fuel spray from the HCCI nozzles of the fuel injector of FIG. 1.
FIG. 1c is a diagrammatic representation of fuel spray from the conventional nozzles of the fuel injector of FIG. 1.
Figure 1B:
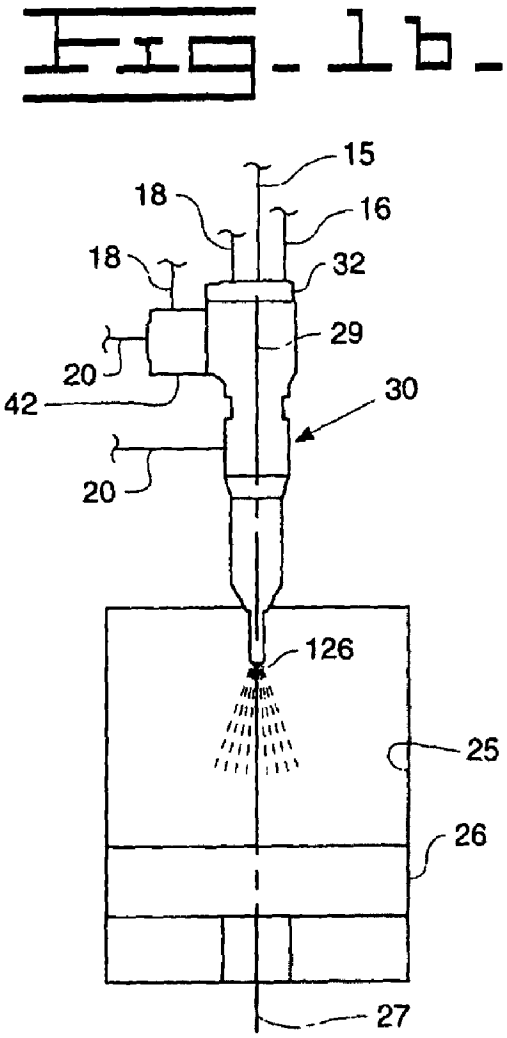

Referring in addition to FIGS. 1b and 1c, there are shown diagrammatic illustrations of fuel spray from HCCI nozzle outlets 126 and conventional nozzle outlets 128, respectively. While fuel injector 30 could be any type of fuel injector, such as a cam actuated or common rail fuel injector, it preferably is a hydraulically actuated fuel injector having at least two modes of operation, and preferably also includes mixed mode capabilities. Therefore, fuel injector 30 preferably has a first configuration that allows for fuel spray via a first portion of nozzle outlets that include one or more Homogeneous Charge Compression Ignition (HCCI) nozzle outlets 126, and a second configuration that allows for fuel spray via a second portion of nozzle outlets that include one or more conventional nozzle outlets 128. In other words, several components of fuel injector 30 are moved to, and positioned in, a first arrangement when fuel injector 30 injects fuel via HCCI nozzle outlets 126 and are moved to, and positioned in, a second arrangement when fuel injector 30 injects fuel via conventional nozzle outlets 128. The configurations might also have a dynamic aspect in which certain components move, do not move, or move differently depending on the configuration.

As illustrated in FIG. 1b, injection from HCCI nozzle outlets 126 preferably produces fuel spray into cylinder 25 that is directed in a first spray pattern relative to cylinder centerline 27 and fuel injector centerline 29. The present invention also contemplates instances in which injector centerline 29 is not co-linear with cylinder centerline 27, such as when injector 30 is at an angle with respect to cylinder centerline 27, or when injector 30 is offset from cylinder centerline 27. Preferably, each of the one or more nozzle outlets 126 is at a first angle θ with respect to centerlines 27 and 29. This first angle is preferably relatively small as illustrated in FIG. 1b, such as on the order of less than or equal to 30 degrees but could be oriented directly along centerline 27. This fuel spray pattern is preferable for a number of reasons. First, because piston 26 is nearer its bottom dead center position when injection from HCCI nozzle outlets 126 occurs, the entire volume of cylinder 25 can be used to mix the fuel with air in cylinder 25. Therefore, when combustion occurs as piston 26 approaches the top dead center position of its compression stroke, preferably a homogeneous mixture will have been created which is believed to combust cleaner than a combustion which results from a typical lean heterogeneous diesel fuel injection. In other words, it is believed that the best mixing of fuel and air into a homogeneous charge over a range of engine speeds will be achieved by spraying fuel into cylinder 25 in this spray pattern. In addition, because the fuel spray is generally directed downward, as opposed to toward the sides of cylinder 25, wetting of these surfaces can be avoided. This is desirable because contact of the pressurized fuel with the cylinder walls can produce smoke or other undesirable emissions. The present invention also contemplates the injection of fuel at two or more angles, including at conventional angles, during an HCCI injection event.

Referring to FIG. 1c, injection from conventional nozzle outlets 128 preferably produces fuel spray that is directed in a second spray pattern relative to cylinder centerline 27 and injector centerline 29. Preferably, each of the one or more nozzle outlets 128 is at a second angle a with respect to centerlines 27 and 29. This second angle is preferably relatively large, as illustrated in FIG. 1c, such as on the order of greater than 60 degrees. This fuel spray pattern is preferable because piston 26 is at or near top dead center position and usable space within cylinder 25 is limited in height. Further, because the air within cylinder 25 is compressed, injection of pressurized fuel should cause a near instantaneous combustion event, thus avoiding cylinder wetting, which could lead to undesirable emission production.

I. FIGS. 2-4

Referring in addition to FIGS. 2a-c and 4, there is shown a sectioned side view of fuel injector 30 according to the preferred embodiment of the present invention, as well as a schematic representation of fuel injector 30. Fuel injector 30 provides an injector body 31 made up of various components attached to one another in a manner well known in the art, and a number of movable parts positioned as they would be prior to an injection event. Fuel injector 30 preferably provides a first electrical actuator 32 and a second electrical actuator 42 which control the timing and duration of HCCI injection events via a three-way valve. Preferably, actuator 32 is a two-position solenoid that includes a biasing spring 33, a coil 34 and an armature 35 that is attached to a valve member 37. Likewise, actuator 42 is also preferably a two-position solenoid that includes a biasing spring 43, a coil 44 and an armature 45 that is attached to a valve member 47, which is part of another three-way valve. Valve members 37 and 47 are preferably poppet valve members, however, it should be appreciated that other suitable valve members, such as spool or ball valve members, could be substituted. Further, while actuators 32 and 42 are preferably solenoids, it should be appreciated that it could instead be any suitable electrical actuator, such as but not limited to a piezoelectric actuator or a stepper motor.

Figure 2A:
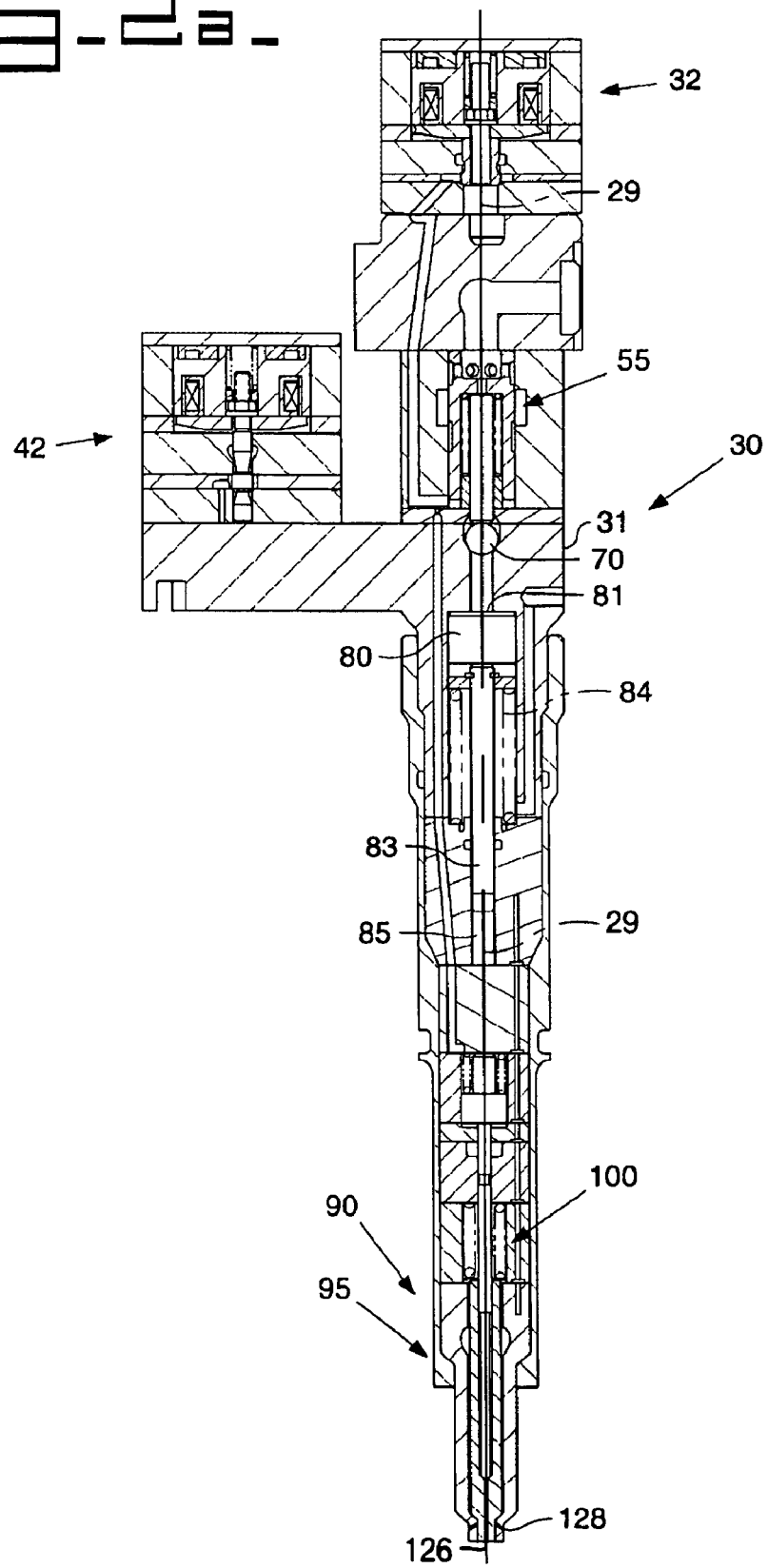
FIG. 2a is a diagrammatic sectioned side view of a fuel injector according to the present invention.
Figure 2B:
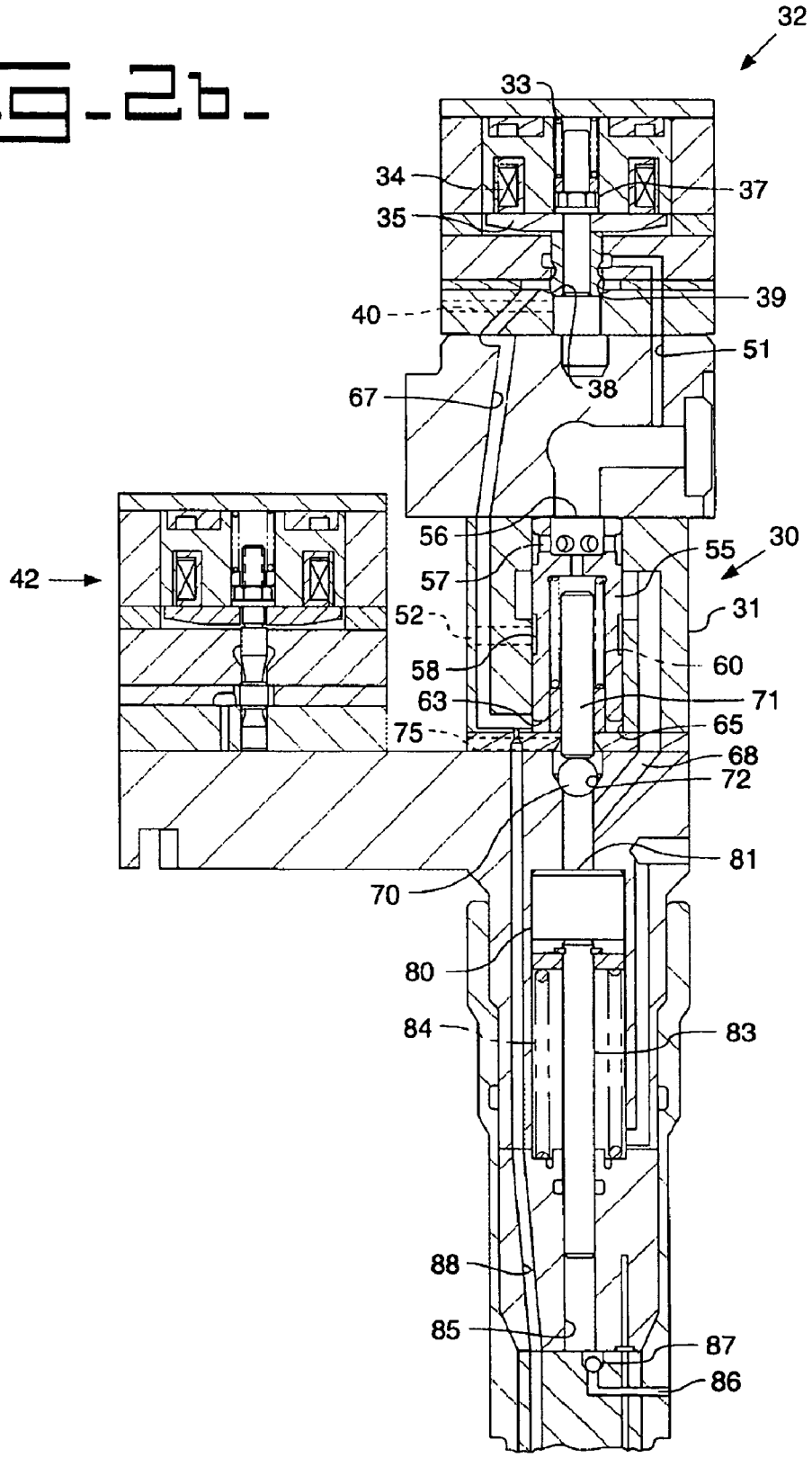
FIG. 2b is a diagrammatic sectioned side view of the top portion of the fuel injector of FIG. 2a, illustrating only a first portion of injector fluid lines.
Figure 4:
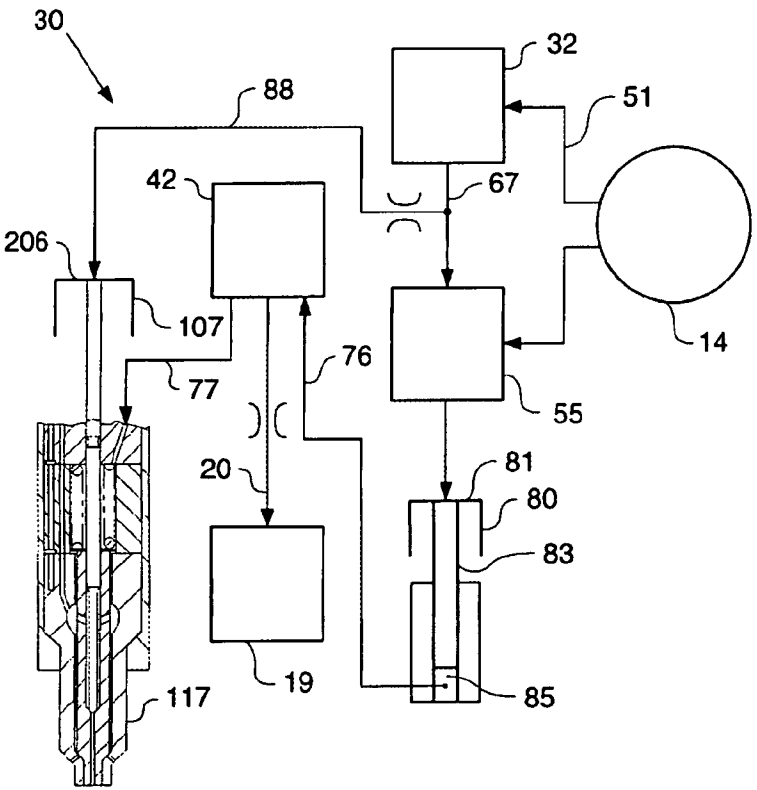
FIG. 4 is a schematic representation of the fuel injector of FIG. 2.

Referring specifically to FIG. 2b and the injector schematic of FIG. 4, valve member 37 is movable between a low pressure seat 38 (as shown) and a high pressure seat 39. When solenoid 32 is de-energized, valve member 37 is biased toward an advanced position closing low pressure seat 38 by biasing spring 33. When valve member 37 is in this position, a variable pressure passage 67 and a pressure communication passage 88, both defined by injector body 31, are fluidly connected to a high pressure passage 51. Passage 88 is connected to passage 67 via a restricted orifice to slow the opening movement of one of the needle valve members discussed infra. When solenoid 32 is energized, armature 35 moves valve member 37 upward to close high pressure seat 39. When valve member 37 is in this retracted position, variable pressure passage 67 and pressure communication passage 88 are fluidly connected to a low pressure passage 40.

Figure 2C:
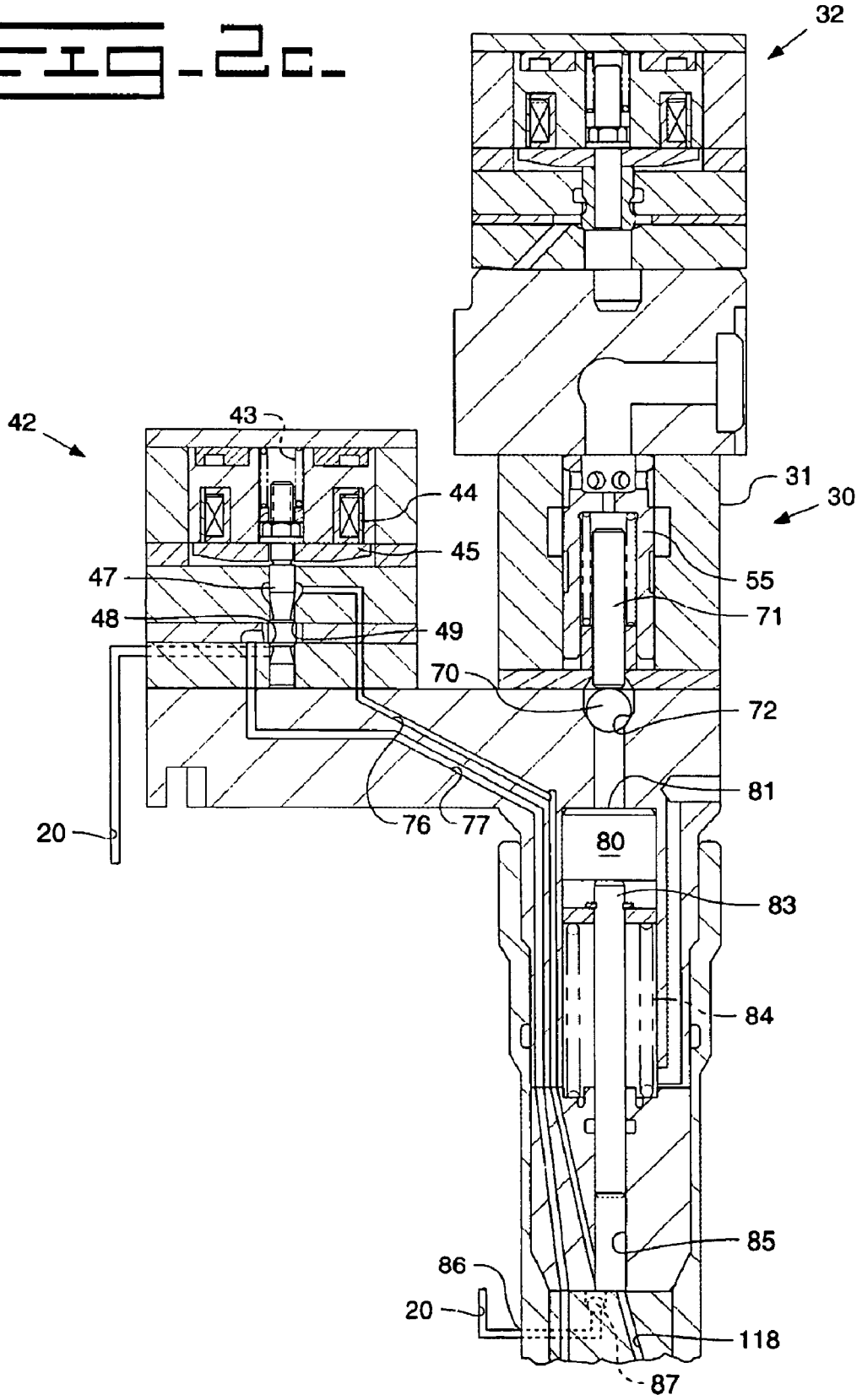
FIG. 2c is a diagrammatic sectioned side view of the top portion of the fuel injector of FIG. 2a, illustrating only a second portion of injector fluid lines.

Referring to FIG. 2c and FIG. 4, valve member 47 is movable between a low pressure seat 48 and a high pressure seat 49. When actuator 42 is de-energized, valve member 47 is biased toward an advanced position closing low pressure seat 48 (as shown) by biasing spring 43. When valve member 47 is in this position, a control line 77, shown in FIG. 3, which is defined by injector body 31, is fluidly connected to fuel pressure in a control supply line 76. Control supply line 76 is fluidly connected to a fuel pressurization chamber 85. When a supply check valve 87 is seated and valve member 47 is in this downward position, high pressure in fuel pressurization chamber 85 and control supply line 76 prevails in control line 77. Between injection events, fuel is at low pressure throughout injector 30. When actuator 42 is energized, armature 45 moves valve member 47 upward to close high pressure seat 49. When valve member 47 is in this position, control line 77 is fluidly connected to low or medium pressure fuel supply line 20.

Returning to fuel injector 30 and referring again to FIG. 2b and the schematic of FIG. 4, a spool valve member 55 is also positioned in injector body 31 and is movable between an upward position as shown, and a downward position. Spool valve member 55 is biased toward its upward position by a biasing spring 60. Spool valve member 55 defines a high pressure annulus 57 that is always open to high pressure passage 51 via a plurality of radial holes. Passage 51 is positioned such that it can open an actuation fluid passage 68 to high pressure passage 51 when spool valve member 55 is in its downward position. A low pressure annulus 58 is also provided on spool valve member 55 that connects actuation fluid passage 68 to a low pressure drain passage 52 defined by injector body 31 when spool valve member 55 is in its upward position as shown. Spool valve member 55 has a control hydraulic surface 63 that is exposed to fluid pressure in a spool cavity 65, and a high pressure surface 56 that is continuously exposed to high pressure in high pressure passage 51. Surfaces 56 and 63 preferably are about equal in effective surface area, but could be different if desired, such as to produce hydraulic biasing in place of biasing spring 60. Spool cavity 65 is fluidly connected to variable pressure passage 67.

When variable pressure passage 67 is fluidly connected to high pressure manifold 14, such as when valve member 37 is in its advanced position, pressure within spool cavity 65 is high and spool valve member 55 is preferably hydraulically balanced and maintained in its retracted position by biasing spring 60. When spool valve member 55 is in this position, actuation fluid passage 68 is blocked from fluid communication with high pressure passage 51 but fluidly connected to low pressure passage 52 via low pressure annulus 58. Conversely, when variable pressure passage 67 is fluidly connected to low pressure reservoir 12, such as when valve member 37 is in its retracted position (activator 32 energized), pressure within spool cavity 65 is sufficiently low that the high pressure acting on high pressure surface 56 can overcome the force of biasing spring 60, and spool valve member 55 can move to its downward position. When spool valve member 55 is in this downward position, actuation fluid passage 68 is blocked from low pressure passage 52 but open to high pressure passage 51 via high pressure annulus 57.

Returning again to fuel injector 30, an intensifier piston 80 is movably positioned in injector body 31 and has a hydraulic surface 81 that is exposed to fluid pressure in actuation fluid passage 68. Piston 80 is biased toward a retracted, upward position by a biasing spring 84. However, when pressure within actuation fluid passage 68 is sufficiently high, such as when it is open to high pressure passage 51, piston 80 can move to an advanced, downward position against the action of biasing spring 84. A plunger 83 is also movably positioned in injector body 31 and moves in a corresponding manner with piston 80. When piston 80 is moved toward its advanced position, plunger 83 also advances and acts to pressurize fuel within a fuel pressurization chamber 85. When plunger 83 is undergoing its retracting stroke, new fuel enters chamber 85 via a fuel inlet 86 past a supply check valve 87. Depending on the area ratio of piston 80 to plunger 83, fuel is raised to some multiple of the actuation fluid pressure. Fuel inlet 86 is in fluid communication with fuel source 19 via fuel supply line 20. During an injection event as plunger 83 moves toward its downward position, check valve 87 is closed and plunger 83 can act to compress fuel within fuel pressurization chamber 85. When plunger 83 is returning to its upward position, fuel is drawn into fuel pressurization chamber 85 past check valve 87.

A pressure relief valve 70 is movably positioned in injector body 31 to vent pressure spikes from actuation fluid passage 68. Pressure spikes can be created when piston 80 and plunger 83 abruptly stop their downward movement due to the abrupt closure of either HCCI nozzle outlet 126 or conventional nozzle outlets 128. Because pressure spikes can sometimes cause an uncontrolled and undesirable secondary injection due to an interaction of components and passageways over a brief instant after main injection has ended, a pressure relief passage 75 extends between actuation fluid passage 68 and a low pressure vent. When spool valve member 55 is in its downward position, such as during an injection event, a pin 71 holds pressure relief ball valve member 70 downward to close a seat 72. When pressure relief valve 70 is in this position, actuation fluid passage 68 is closed to pressure relief passage 75 and pressure can build within actuation fluid passage 68. However, immediately after injection events, when piston 80 and plunger 83 are hydraulically slowed and stopped, residual high pressure in actuation fluid passage 68 can act against pressure relief valve 70. Because pressure within spool cavity 65 is high, spool valve member 55 is hydraulically balanced and can move toward its upward position under the action of biasing spring 60. Pressure relief valve 70 can then lift off of seat 72 to open actuation fluid passage 68 to pressure relief passage 75, thus allowing pressure within actuation fluid passage 68 to be vented. At the same time, upward movement of pressure relief valve 70, and therefore pin 71 can aid in the movement of spool valve member 55 toward its upward position.

Figure 3:
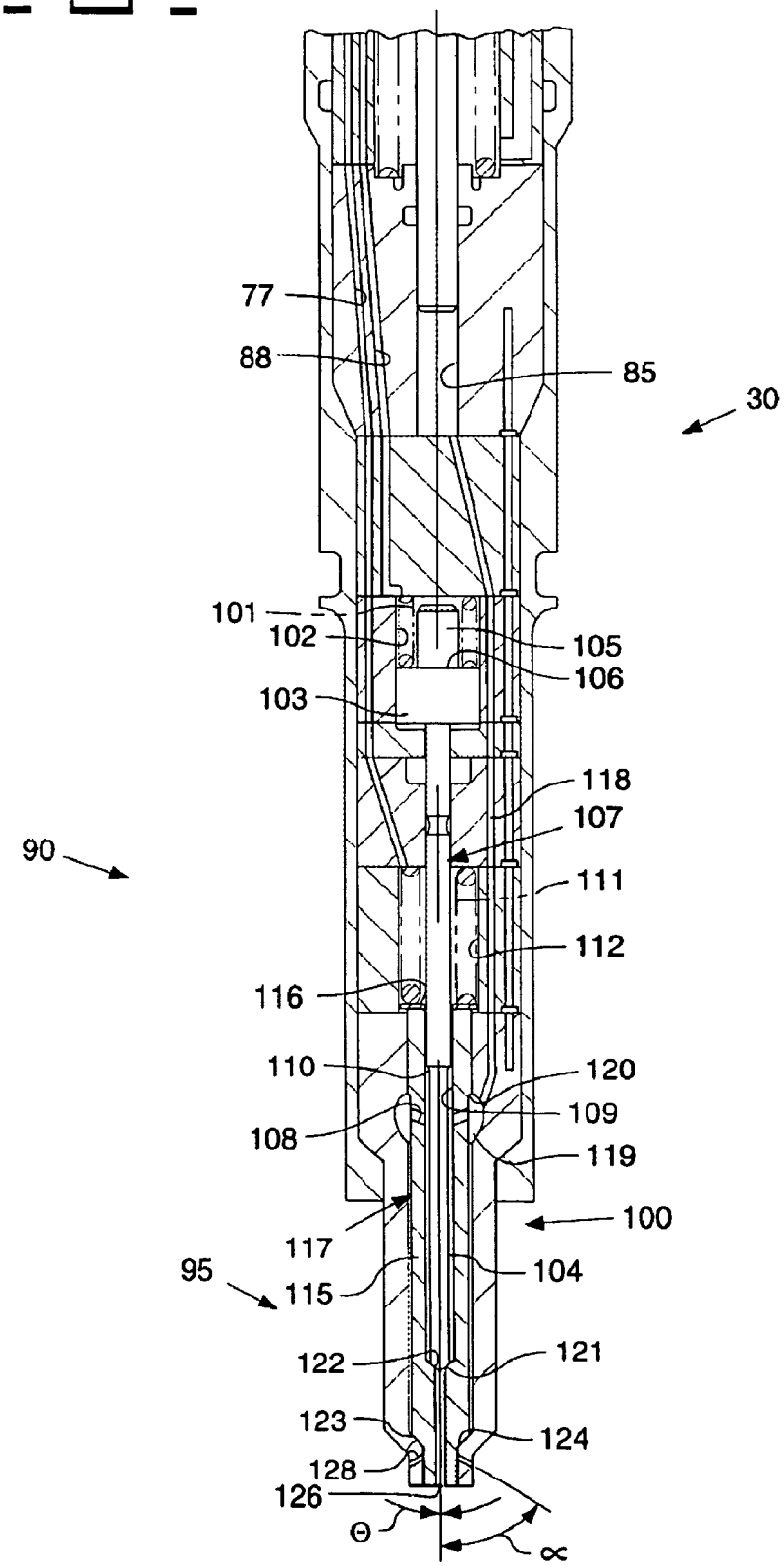
FIG. 3 is a diagrammatic sectioned side view of the nozzle portion of the fuel injector of FIG. 2.

Referring to FIG. 3, fuel injector 30 includes a nozzle assembly 90 with a needle valve 109. As illustrated, needle valve 100 preferably includes an HCCI needle valve member 107 and a conventional needle valve member 117. HCCI needle valve member 107 is movable between an open position fluidly connecting fuel pressurization chamber 85 to HCCI nozzle outlet 126, and a closed position. Valve member 107 is biased toward its closed position by a biasing spring 101. HCCI needle valve member 107 preferably includes a stop pin 105 that defines the travel distance between its open and closed positions. HCCI needle valve member 107 also includes a piston portion 103 that provides a closing hydraulic surface 106 exposed to fluid pressure in an HCCI needle control chamber 102, which is fluidly connected to pressure communication passage 88. A needle portion 104 is also included on HCCI needle valve member 107 that provides an opening hydraulic surface 110 exposed to fluid pressure in an HCCI nozzle chamber 109. Preferably, nozzle chamber 109 is defined in part by HCCI needle valve member 107 and conventional needle valve member 117 and is fluidly connected to fuel pressurization chamber 85 via an HCCI nozzle supply passage 108, defined by conventional needle valve member 117.

Preferably, opening hydraulic surface 110 and closing hydraulic surface 106 are sized and positioned such that when needle control chamber 102 is open to high pressure passage 51 via pressure communication passage 88, needle valve member 107 will remain in, or move toward, its downward closed position, regardless of the fuel pressure acting on opening hydraulic surface 110. When needle valve member 107 is in its closed position, a conical or spherical valve surface 121 provided on needle portion 104 closes a conical valve seat 122 provided on needle valve member 117 to block nozzle supply passage 108 from fluid communication with HCCI nozzle outlet(s) 126. However, when needle control chamber 102 is open to low pressure passage 40 and fuel pressure within nozzle chamber 109 reaches an HCCI valve opening pressure, needle valve member 107 can be lifted against the bias of biasing spring 101 toward its open position, thus lifting valve surface 121 from valve seat 122. It should be appreciated that the HCCI valve opening pressure is a function of the force of biasing spring 101 as well as the size of opening hydraulic surface 110. Fuel can now spray into cylinder 25 via HCCI nozzle outlet 126 when seat 122 is open. Recall that when fuel injection is occurring via HCCI nozzle outlet 126, fuel injector 30 is in its first configuration, as indicated above. When fuel injector 30 is in this configuration, fuel spray into cylinder 25 is at a relatively small angle $\theta$ with respect to injector centerline 29 and cylinder centerline 27. As best illustrated in FIG. 3, HCCI nozzle outlet 126 is preferably defined such that $\theta$ is zero for this embodiment of the present invention.

Returning to nozzle assembly 90, needle valve 109 also includes a conventional needle valve member 117 that provides an outer check member 115. Needle valve member 117 has a closing hydraulic surface 116, provided on outer check member 115, that is exposed to fluid pressure in a conventional needle control chamber 112 which is defined at least in part by injector body 31. Needle valve member 117 also preferably includes an opening hydraulic surface 120 that is exposed to fluid pressure in a nozzle supply passage 118, defined by injector body 31. Conventional needle valve member 117 is biased toward a closed position by a biasing spring 111. As with HCCI needle valve member 107, preferably the respective surfaces and strengths of springs, closing hydraulic surface 116, opening hydraulic surface 120 and biasing spring 111 are such that needle valve member 117 will remain in its downward position when high pressure is acting on closing hydraulic surface 116, regardless of the fuel pressure acting on opening hydraulic surface 120.

When the fuel pressure force acting on closing hydraulic surface 116 and the biasing force of biasing spring 111 exceed the fuel pressure force acting on opening hydraulic surface 120, needle valve member 117 remains in its biased, closed position, blocking conventional nozzle outlets 128. In other words, valve surface 123 is in contact to close seat 124. When the fuel pressure force acting on opening hydraulic surface 120 exceeds the fluid pressure acting on closing hydraulic surface 116, the biasing force of biasing spring 111 (i.e. conventional valve opening pressure), the biasing force of spring 101 and the hydraulic force on closing hydraulic surface 106, needle valve member 117 is lifted to an open position fluidly connecting nozzle supply passage 118 with conventional nozzle outlets 128. When fuel injection is occurring via conventional nozzle outlets 128, recall that fuel injector 30 is in its second configuration, as indicated above. It should be appreciated that a guide clearance preferably exists between needle valve member 117 and injector body 31, such that fuel substantially cannot migrate around needle valve member 117 and spray out of HCCI nozzle outlet 126 during the conventional injection event. When fuel injector 30 is in this second configuration, fuel spray into cylinder 25 is in a second spray pattern corresponding to the relatively large angle $\alpha$ of conventional nozzle outlets 128 with respect to centerlines 27 and 29.

Note that while needle valve member 107 is also lifted by the upward movement of needle valve member 117, HCCI nozzle outlet 126 remains closed during the conventional injection event. This is due to a number of factors. First, the valve opening pressure of conventional needle valve member 117 is less than the valve opening pressure of HCCI needle valve member 107. In other words, when low pressure is acting on both HCCI closing hydraulic surface 106 and conventional closing hydraulic surface 116 in their respective needle control chambers 102, 112, conventional needle valve member 117 the conventional valve opening pressure will be reached prior to the HCCI valve opening pressure being reached. It should be appreciated that because conventional needle valve member 117 must overcome the spring force of both HCCI biasing spring 101 and conventional biasing spring 111, opening hydraulic surface 120 should be sized appropriately with respect to opening hydraulic surface 110 to allow for a lower conventional valve opening pressure than the HCCI valve opening pressure. Thus, conventional needle valve member 117 will begin to move toward its open position, moving HCCI needle valve member 107 upward, before HCCI needle valve member 107 can move upward on its own. In addition, stop pin 105 of HCCI needle valve member 107 also limits the upward movement of conventional needle valve member 117. Thus, once conventional needle valve member 117 reaches its upward position, stop pin 105 prevents HCCI needle valve member 107 from lifting away from conventional needle valve member 117. Those skilled in the art will recognize that the respective HCCI valve opening pressure and conventional valve opening pressure can be set somewhat independently by appropriate sizing of surfaces 110, 120, 106 and 116 as well as choosing appropriate preloads on springs 101 and 111.

II. FIG. 5

Figure 5:
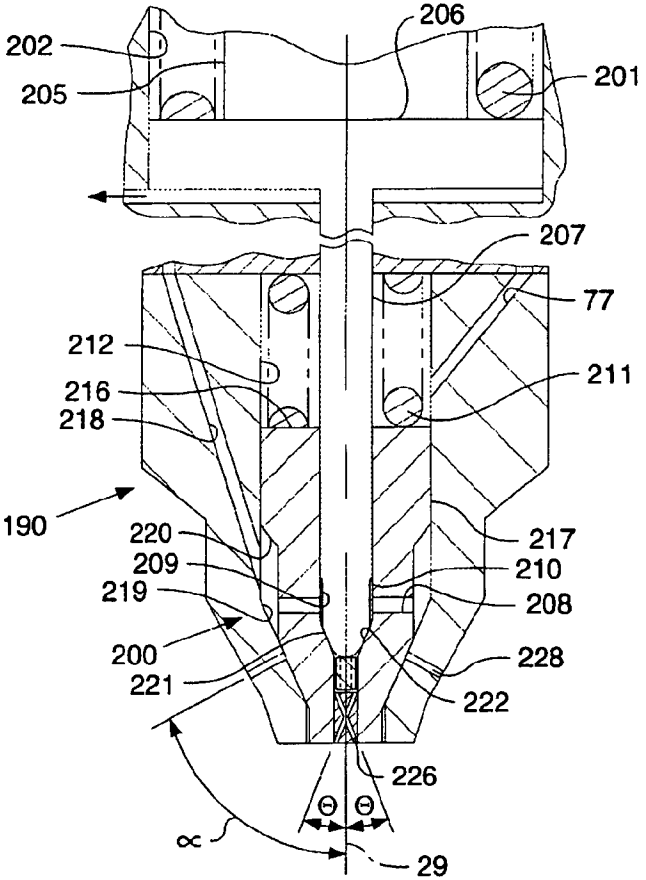
FIG. 5 is a diagrammatic sectioned side view of an alternative needle valve nozzle portion for use with the fuel injector of FIG. 2.

Referring now to FIG. 5, there is shown another embodiment of a nozzle assembly 190 for use with the present invention. Nozzle assembly 190 includes a nested needle valve 200 that provides an inner HCCI needle valve member 207 and an outer or conventional needle valve member 217. It should be appreciated that with minor modifications to fuel injector 30, needle valve 200 could be inserted into injector body 31 to create a complete injector. Thus, the majority of fuel injector 30 components described for the FIGS. 1-4 embodiment of the present invention remain unchanged when nozzle assembly 190 is substituted into fuel injector 30. For instance, when utilized with nozzle assembly 190, fuel injector 30 continues to include a first electrical actuator 32 that controls the flow of hydraulic fluid to a control surface 63 of spool valve member 55 and the closing hydraulic surface 206 of HCCI needle valve member 207. In addition, fuel injector 30 also preferably continues to provide a second electrical actuator 42 that controls the pressure on the closing hydraulic surface 216 of conventional needle valve member 217. Further, fuel injector 30 also provides a piston/plunger assembly for pressurization of fuel within fuel injector 30 to injection levels. While these like components will not be described in detail, those components of fuel injector 30 and nozzle assembly 190 that differ from the previous embodiment of the present invention will be discussed.

HCCI valve member 207 is movable between a downward, closed position and an upward, open position, and is biased toward its closed position by a biasing spring 201. A stop pin 205 limits the upward movement of needle valve member 207. HCCI needle valve member 207 provides a closing hydraulic surface 206 that is exposed to fluid pressure in an HCCI needle control chamber 202 which is fluidly connected to pressure communication passage 88 (FIG. 22b). Also provided on needle valve member 207 is an opening hydraulic surface 210 that is exposed to fluid pressure in a nozzle chamber 209. Nozzle chamber 209 is fluidly connected to fuel pressurization chamber 85 (FIG. 2c) via a nozzle supply passage 218 and a nozzle connection passage 208. Preferably, the relative sizes and strengths of closing hydraulic surface 206, opening hydraulic surface 210 and biasing spring 201 are such that needle valve member 207 remains in, or moves toward, its downward position when closing hydraulic surface 206 is exposed to high pressure actuation fluid, regardless of whether fuel pressure at injection levels is being exerted on opening hydraulic surface 210. When needle valve member 207 is in its closed position, a set of HCCI nozzle outlets 226 are blocked from a nozzle supply passage 218. When needle valve member 207 is in its open position, corresponding to the first configuration of fuel injector 30, HCCI nozzle outlets 226 are open to nozzle supply passage 218 via a nozzle supply passage 208 and nozzle chamber 209. When fuel injector 30 is in this configuration, fuel spray into cylinder 25 via HCCI nozzle outlets 226 is at a relatively small angle θ with respect to injector centerline 29 and cylinder centerline 27. However, in contrast with the previously illustrated embodiment, note that θ is greater than zero for this embodiment. It should, however, be appreciated that one or more HCCI nozzle outlet(s) being oriented at a zero angle, as in the previous embodiment, could instead be provided.

As illustrated, HCCI needle valve member 207 is movable within a bore defined by a conventional needle valve member 217. Conventional needle valve member 217 includes a closing hydraulic surface 216 that is exposed to fluid pressure in a conventional needle control chamber 212, which is in fluid communication with control pressure line 77 (FIG. 2c). Fluid pressure in conventional needle control chamber 212 is controlled by second electrical actuator 42, in the same manner described for the previous embodiment of the present invention. Also provided on conventional needle valve member 217 is an opening hydraulic surface 220 that is exposed to fluid pressure in a nozzle chamber 219. Nozzle chamber 219 is fluidly connected to fuel pressurization chamber 85 (FIG. 2c) via nozzle supply passage 218. Preferably, as with HCCI needle valve member 207, the relative sizes and strengths of closing hydraulic surface 216, opening hydraulic surface 220 and biasing springs 201 and 211 are such that conventional needle valve member 217 remains in, or moves toward its downward, closed position when high pressure fuel is acting on closing hydraulic surface 216, regardless of whether fuel pressure acting on opening hydraulic surface 220 has reached injection levels. When needle valve member 217 is in its closed position, a set of conventional nozzle outlets 228 are blocked from nozzle chamber 219. In other words, valve surface 221 is seated in seat 222. When needle valve member 217 is in its open position, corresponding to the second configuration of fuel injector 30, nozzle outlets 228 are open to nozzle chamber 219, and pressurized fuel can spray into cylinder 25. When fuel injector 30 is in this second configuration, fuel spray into cylinder 25 is in a second spray pattern corresponding to the relatively large angle α of conventional nozzle outlets 228 with respect to centerlines 27 and 29.

Note that while needle valve member 207 is also lifted by the upward movement of needle valve member 217, HCCI nozzle outlets 226 remains closed during the conventional injection event. This is due to a number of factors, similar to those discussed for the previous embodiment of the present invention. First, the valve opening pressure of conventional needle valve member 217 is less than the valve opening pressure of HCCI needle valve member 207. In other words, when low pressure is acting on both HCCI closing hydraulic surface 206 and conventional closing hydraulic surface 216 in their respective needle control chambers 202, 212, conventional needle valve member 217 the conventional valve opening pressure will be reached prior to the HCCI valve opening pressure being reached. It should be appreciated that because conventional needle valve member 217 must overcome the spring force of both HCCI biasing spring 201 and conventional biasing spring 211, opening hydraulic surface 220 should be sized appropriately for a desired conventional valve opening pressure that is preferably lower than the HCCI valve opening pressure. Thus, conventional needle valve member 217 will begin to move toward its open position, moving HCCI needle valve member 207 upward, before HCCI needle valve member 207 can move upward on its own. In addition, upward movement of HCCI needle valve member 207 and conventional needle valve member 217 are limited by stop pin 205. Thus, once conventional needle valve member 217 reaches its upward position, stop pin 205 prevents HCCI needle valve member 207 from lifting away from conventional needle valve member 217.

III. FIGS. 6-7

Figure 7:
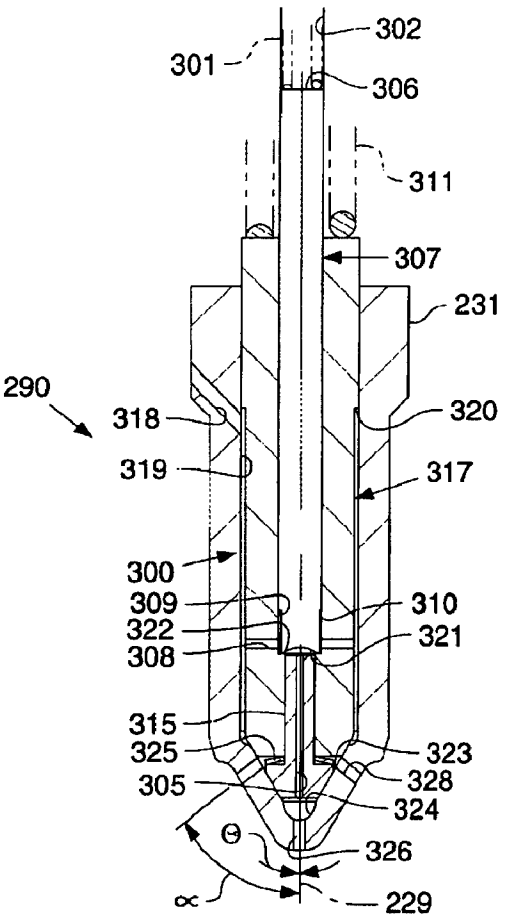
FIG. 7 is a diagrammatic sectioned side view of a needle valve nozzle portion of the fuel injector of FIG. 6.
Figure 6:
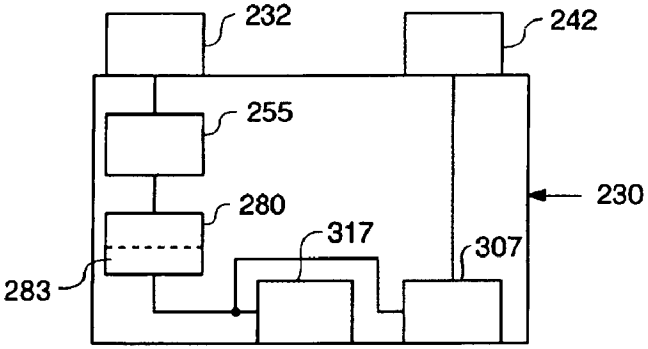
FIG. 6 is a schematic representation of a fuel injector according to an alternate embodiment of the present invention.

Referring now to FIGS. 6 and 7, there is illustrated a schematic representation of a fuel injector 230 as well as another nozzle assembly 290 for use with the present invention. Note that fuel injector 230 is very similar to fuel injector 30, and contains a number of similar components. For instance, fuel injector 230 also provides two electrical actuators that control pressure and fluid flow within the injector. However, in this embodiment, first electrical actuator 232 controls the pressure of hydraulic fluid acting on a control hydraulic surface of spool valve member 255, which controls flow of high pressure actuation fluid to intensifier piston 280. The second electrical actuator 242 controls the pressure of hydraulic fluid acting on the closing surface of the HCCI needle valve member 307. It should be appreciated that first electrical actuator 232 and second electrical actuator 242 are preferably similar to first electrical actuator 32 and second electrical actuator 42 disclosed for the FIGS. 2-4 embodiment of the present invention. However, it should be appreciated that they could instead be any suitable actuators, including but not limited to piezo-electric actuators voice coils or possibly even stepper motors. In addition, as best illustrated in FIG. 6, fuel injector 230 also provides an intensifier piston/plunger assembly, which is preferably similar to that shown in FIG. 2a, for the pressurization of fuel within the injector to injection levels. This embodiment differs in that outer needle 317 is biased closed by a spring 311, but is not directly controlled. In other words, outer needle valve member does not include a closing hydraulic surface exposed to different pressures based upon the energization state of actuators 32 and 42.

Returning to FIGS. 6 and 7, nozzle assembly 290 provides a needle valve 300 having an HCCI needle valve member 307, a conventional or outer needle valve member 317 and an inner sealing member 315. As illustrated in FIG. 7, inner sealing member 315 is preferably biased to a downward position by a bellville spring 325 to block an annular sac 323 from a sac 324. Preferably, spring 325 will hold inner sealing member 315 in this downward position continuously, regardless of whether outer check member 317 is in its upward, open position or its downward, closed position. It should be appreciated that while a bellville spring has been illustrated, any other biasing means could be included to maintain inner sealing member 315 in its downward position.

HCCI needle valve member 307 is movable between an upward, open position and a downward, closed position and is biased toward its closed position (as shown) by a biasing spring 301. HCCI needle valve member 307 includes a closing hydraulic surface 306 that is exposed to fluid pressure in an HCCI needle control chamber 302. When second electrical actuator 242 is energized, needle control chamber 302 is preferably fluidly connected to high pressure oil rail 14 via a high pressure passage and a pressure control line defined by fuel injector 230. Alternatively, when second electrical actuator 242 is de-energized, needle control chamber 302 is preferably fluidly connected to low pressure reservoir 12 by the pressure control line and a low pressure passage defined by fuel injector 230. Needle valve member 307 also preferably includes an opening hydraulic surface 310 that is exposed to fuel pressure in a first, HCCI nozzle chamber 309. Preferably, HCCI nozzle chamber 309 is fluidly connected to a fuel pressurization chamber (such as fuel pressurization chamber 85, illustrated in FIG. 2b) via a nozzle supply passage 318, defined by injector body 231. The relative sizes and strengths of opening hydraulic surface 310, closing hydraulic surface 306 and biasing spring 301 are preferably such that needle valve member 307 will remain in, or move towards, its downward, closed position when needle control chamber 302 is open to high pressure rail 14.

Needle valve member 307 includes a knife edge valve surface 321 that closes a planar valve seat 322 that is included on outer needle valve member 317 when needle valve member 307 is in its downward, closed position. When valve seat 322 is closed, nozzle chamber 309 is blocked from an HCCI nozzle outlet 326 defined by injector body 231. When valve seat 322 is open, such as when needle valve member 307 is away from valve seat 322, nozzle chamber 309 is fluidly connected to HCCI nozzle outlet(s) 326 via a nozzle connection passage 308 defined by conventional needle valve member 317 and a spray passage 305 defined by inner sealing member 315. When valve seat 322 is open, fuel injector 230 is in its first configuration. When fuel injector 230 is in this configuration, fuel spray into cylinder 25 is at a relatively small angle $\theta$ with respect to injector centerline 229 and cylinder centerline 27. As best illustrated in FIG. 7, HCCI nozzle outlet 126 is preferably defined such that $\theta$ is zero for this embodiment of the present invention.

Returning now to needle valve 300, also included is conventional needle valve member 317 which is movable between an upward, open position and a downward, closed position. Needle valve member 317 is biased toward its downward position by a biasing spring 311. Needle valve member 317 includes an opening hydraulic surface 320 that is exposed to fuel pressure in a second or conventional nozzle chamber 319. Preferably, nozzle chamber 319 is fluidly connected to a fuel pressurization chamber via nozzle supply passage 318. When needle valve member 317 is in its downward position, conventional nozzle outlets 328 are blocked from nozzle chamber 319. When needle valve member 317 is away from its closed position, fuel injector 230 is in its second configuration and conventional nozzle outlets 328 are open to nozzle chamber 319 to allow fuel spray from conventional nozzle outlets 328 to commence. When fuel injection is occurring via conventional nozzle outlets 328, recall that fuel injector 230 is in its second configuration, as indicated above. When fuel injector 230 is in this second configuration, fuel spray into cylinder 25 is in a second spray pattern corresponding to the relatively large angle $\alpha$ of conventional nozzle outlets 328 with respect to centerlines 27 and 229.

Note that while needle valve member 307 is also lifted by the upward movement of needle valve member 317, HCCI nozzle outlet 326 remains closed during the conventional injection event. This is due to the fact that high pressure actuation fluid acting on closing hydraulic surface 306 prevents valve member 307 from lifting off its seat 322. The respective valve opening pressures can be set with some independence by setting appropriate preloads for springs 301 and 311, as well as by appropriately sizing closing hydraulic surface 306 and opening hydraulic surfaces 310 and 320. However, the HCCI valve opening pressure is preferably lower than the conventional valve opening pressure to avoid simultaneously opening both sets of outlets. When high pressure is acting on HCCI closing hydraulic surface 306, the conventional valve opening pressure will be reached before a pressure sufficient to lift HCCI needle valve member 307 against the force of both hydraulic fluid acting on closing hydraulic surface 306 and the downward force of biasing spring 301. It should be appreciated that because conventional needle valve member 317 must overcome the spring force of both HCCI biasing spring 301 and conventional biasing spring 311, as well as the hydraulic force being exerted on closing hydraulic surface 302, opening hydraulic surface 320 should be sized appropriately with respect to opening hydraulic surface 310 to allow for a higher conventional valve opening pressure than the HCCI valve opening pressure. Thus, conventional needle valve member 317 will begin to move toward its open position, moving HCCI needle valve member 307 upward, before HCCI needle valve member 307 can move upward on its own. It should be noted that, when operating in an HCCI mode, fuel pressure should be maintained below the conventional valve opening pressure to avoid opening both sets of outlets simultaneously. However, simultaneous opening may be desirable in some instances.

IV. FIGS. 8-9

Figure 9:
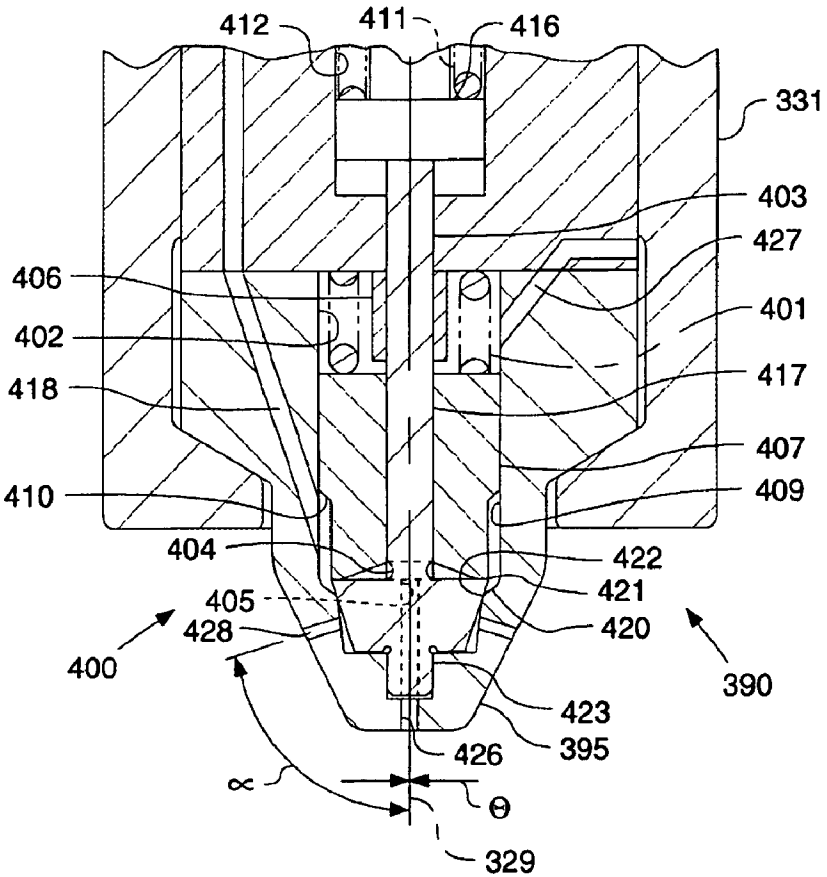
FIG. 9 is a diagrammatic sectioned side view of a nested needle valve nozzle portion of fuel injector of FIG. 8.
Figure 8:
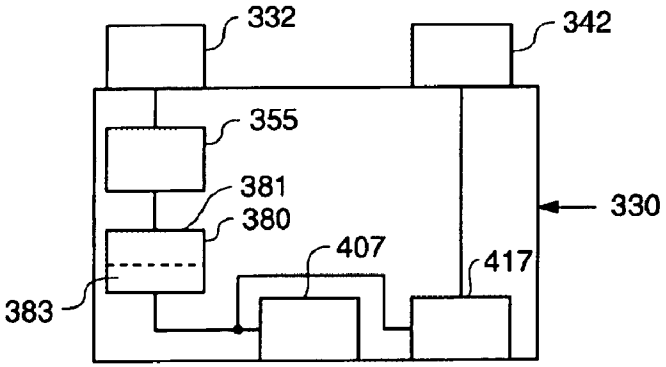
FIG. 8 is a schematic representation of a fuel injector according to an another alternate embodiment of the present invention.

Referring now to FIGS. 8 and 9, there is shown a schematic representation of a fuel injector 330 according to another embodiment of the present invention, as well as a nozzle assembly 390 for use with fuel injector 330. The fuel injector of FIGS. 8 and 9 is similar to that of FIGS. 6 and 7 in that the outer or HCCI needle 407 is not directly controlled via the application of high ore low pressure to a closing hydraulic surface. Instead, needle 407 is merely spring biased closed. In the FIGS. 6 and 7 embodiment, the HCCI needle was directly controlled while the conventional needle was merely spring biased. Note also that fuel injector 330 is very similar to fuel injector 30, and contains a number of similar components. For instance, fuel injector 330 also provides two electrical actuators that control pressure and fluid flow within the injector. It should be appreciated that first electrical actuator 332 and second electrical actuator 342 are preferably similar to first electrical actuator 32 and second electrical actuator 42 disclosed for the FIGS. 2-4 embodiment of the present invention, however, it should be appreciated that they could instead be any suitable actuators, such as piezoelectric actuators voice coils, or stepper motors. In addition, as best illustrated in FIG. 8, fuel injector 330 also provides a piston 380/plunger 383 assembly for the pressurization of fuel within the injector to injection levels. As with actuator 32 discussed previously, first electrical actuator 332 controls fluid pressure to a control surface on spool valve member 355, which in turn controls the movement of the same. When spool valve member is moved from a first, biased position to a second, advanced position, a hydraulic surface 381 of an intensifier piston 380 is exposed to high pressure actuation fluid. Preferably, this actuation fluid is an amount of high pressure engine lubricating oil, however, it should be appreciated that any suitable actuation fluid could be substituted, such as fuel or coolant fluid. When high pressure acts on hydraulic surface 381, piston 380, together with a plunger 381, advance to pressurize fuel within fuel injector 330 for an injection event.

Returning now to nozzle assembly 390, a nested needle valve 400 is provided that includes an HCCI needle valve member 407 and a conventional needle valve member 417. Unlike the previous embodiments that have been illustrated, note that HCCI needle valve member 407 is the outer needle valve member, while the conventional needle valve member 417 is the inner needle valve member in this embodiment. Outer HCCI needle valve member 407 is movable between a downward closed position and an upward open position, opening HCCI nozzle outlets 426, and is limited in its upward movement by a sleeve 406. HCCI needle valve member 407 is biased toward its downward position by a biasing spring 401, closing HCCI nozzle outlets 426. Included on HCCI needle valve member 407 is an opening hydraulic surface 410 that is exposed to fluid pressure in a nozzle supply passage 418. As with previously disclosed embodiments of the present invention, preferably the relative size and strength of biasing spring 401 and opening hydraulic surface 410 are such that needle valve member 407 remains in its closed position when fuel pressure in nozzle supply passage 418 is below a predetermined HCCI valve opening pressure.

When HCCI needle valve member 407 is in its closed position, such as when first electrical actuator 332 is de-energized and piston 380 and plunger 383 have not moved to pressurize fuel within injector 330, a valve surface 421 included on needle valve member 407 is in contact with a flat valve seat 422, included on conventional needle valve member 417. When valve seat 422 is closed, valve surface 421 of valve member 407 blocks nozzle supply passage 418 from fluid communication with an HCCI nozzle outlet 426. When valve seat 422 is open, such as when needle valve member 407 is in its upward position, HCCI nozzle outlet 426 is open to nozzle supply passage 418 via an annulus 404 and a spray passage 405, both defined by needle valve member 407. When needle valve member 407 is in this position, corresponding to a first configuration of fuel injector 330, pressurized fuel can flow through annulus 404 and spray passage 405 and spray into cylinder 25 via HCCI nozzle outlet 426. When fuel injector 330 is in this configuration, fuel spray into cylinder 25 is at a relatively small angle θ with respect to injector centerline 329 and cylinder centerline 27. As best illustrated in FIG. 3, HCCI nozzle outlet 426 is preferably defined such that θ is small and maybe even zero for this embodiment of the present invention. It should be appreciated that while only one HCCI nozzle outlet 426 has been illustrated, tip portion 395 could define any practical number of HCCI nozzle outlets sized and positioned to direct the spray of fuel at a desired, and likely relatively small, angle with respect to injector centerline 29 or cylinder centerline 27. In addition, it should be appreciated that when HCCI needle valve member 407 lifts to its upward position, an amount of fuel can migrate into a spring chamber 402 located above needle valve member 407. Therefore, a low pressure fuel return line 427 preferably fluidly connects spring chamber 402 to a fuel drain to allow this migrating fuel to be displaced as needle valve member 407 lifts to its upward position, as shown.

Returning again to needle valve 400, inner conventional needle valve member 417 is movable between an upward, open position and a downward, closed position. Needle valve member 417 preferably includes an upper guide portion 403 and a lower guide portion 423. In addition to guiding needle valve member 417 in its movement, these matched clearances preferably help stop the migration of various injector fluids past the guide surfaces. A biasing spring 411 preferably biases conventional needle valve member 417 toward its downward, closed position. Needle valve member 417 includes a closing hydraulic surface 416 that is exposed to fluid pressure in a needle control chamber 412. Fluid pressure in needle control chamber 412 is preferably controlled by second electrical actuator 342. Preferably, when second electrical actuator 342 is de-energized, closing hydraulic surface 416 is exposed to an amount of high pressure actuation fluid, such as engine lubricating oil. When second electrical actuator 342 is energized, closing hydraulic surface 416 is then exposed to low pressure. While engine lubricating oil is preferably utilized as the actuation fluid exposed to closing hydraulic surface 416, it should be appreciated that any suitable actuation fluid, such as fuel, could also be utilized.

Also provided on needle valve member 417 is an opening hydraulic surface 420 that is exposed to fluid pressure in nozzle chamber 409. When pressure within nozzle supply passage 418 is below a conventional valve opening pressure, needle valve member 417 remains in its downward, biased position, closing a set of conventional nozzle outlets 428. It should be appreciated that the valve opening pressure of needle valve member 417 should be lower than the valve opening pressure of needle valve member 407. This will help to ensure that needle valve member 407 does not move to its upward, open position as conventional needle valve member 417 lifts for a conventional injection event. Thus, as a result of the relatively high valve opening pressure of needle valve member 407, biasing spring 401 will hold valve member 407 in a downward position with respect to needle valve member 417 such that valve seat 422 is not opened during a conventional injection event. In other words, fuel pressure preferably remains below the HCCI valve opening pressure at least until HCCI needle valve member contacts sleeve 406, which acts to hold Flat seat 422 closed during a conventional injection event. In addition, lower guide portion 423 is positioned such that nozzle outlet 426 remains blocked from nozzle chamber 409 when needle valve member 417 is in its open position.

When needle valve member 417 is in its closed position, conventional nozzle outlets 428 are closed, blocking fuel spray into cylinder 25 via these orifices. However, when fuel pressure acting on opening hydraulic surface 420 exceeds a valve opening pressure, needle valve member 417 is lifted to its open position, corresponding to the second configuration of fuel injector 330. Pressurized fuel in nozzle supply passage 408 can then spray into cylinder 25 via conventional nozzle outlets 428. When fuel injection is occurring via conventional nozzle outlets 428, recall that fuel injector 330 is in its second configuration, as indicated above. When fuel injector 330 is in this second configuration, fuel spray into cylinder 25 is in a second spray pattern corresponding to the relatively large angle $\alpha$ of conventional nozzle outlets 428 with respect to centerlines 27 and 329.

Note that while needle valve member 407 is also lifted by the upward movement of needle valve member 417, HCCI nozzle outlet 426 remains closed during the conventional injection event. This is due to a number of reasons. First, the difference in the valve opening pressures of HCCI needle valve member 407 and conventional needle valve member 417. The conventional valve opening pressure required to lift conventional needle valve member 417 from its closed position is less than the HCCI valve opening pressure required to lift HCCI needle valve member 307 from its closed position. It should be appreciated that because conventional needle valve member 417 must overcome the spring force of both HCCI biasing spring 401 and conventional biasing spring 411, opening hydraulic surface 420 should be sized appropriately with respect to opening hydraulic surface 410 to allow for a lower conventional valve opening pressure than the HCCI valve opening pressure. Thus, conventional needle valve member 417 will begin to move toward its open position, moving HCCI needle valve member 407 upward, before HCCI needle valve member 407 can move upward on its own. In addition, sleeve 406 also limits the upward movement of conventional needle valve member 417. Thus, once conventional needle valve member 417 reaches its upward position, sleeve 406 prevents HCCI needle valve member 407 from lifting away from conventional needle valve member 417.

V. FIGS. 10-11

Figure 11:
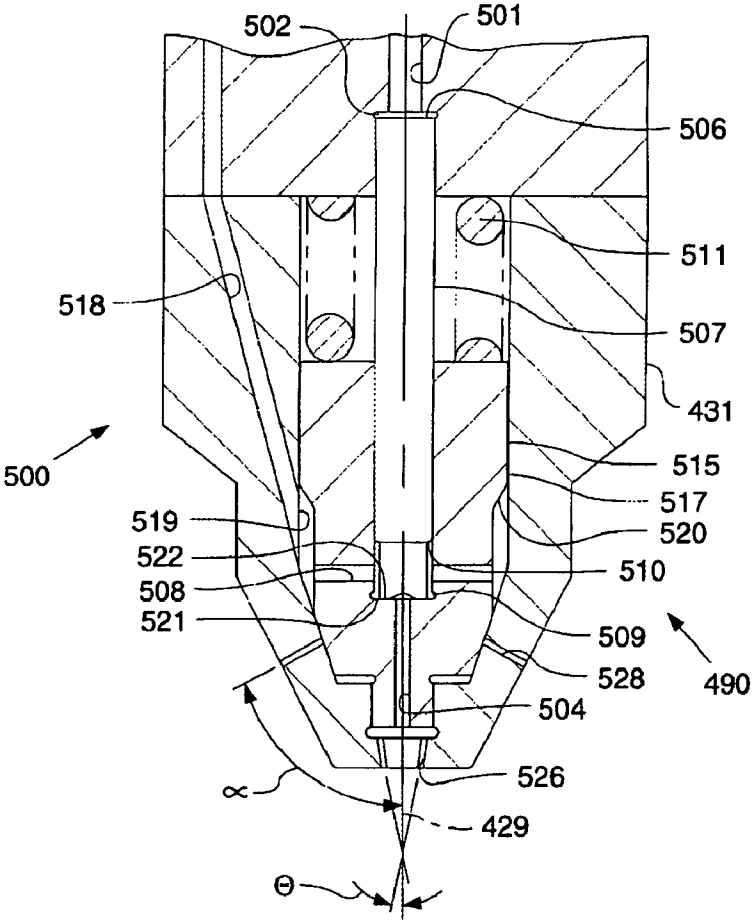
FIG. 11 is a diagrammatic sectioned side view of a nested needle valve nozzle portion of the fuel injector of FIG. 10.
Figure 10:
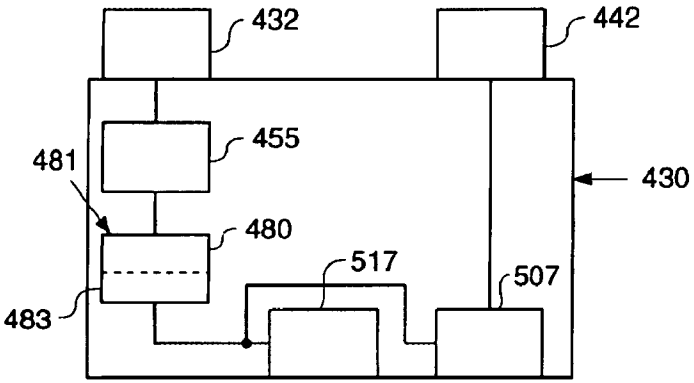
FIG. 10 is a schematic representation of a fuel injector according to yet another embodiment of the present invention.

Referring now to FIGS. 10 and 11, there is illustrated a schematic representation of a fuel injector 430 according to another embodiment of the present invention, as well as a nozzle assembly 490 for use with fuel injector 430. Fuel injector 430 is similar to fuel injector 330, discussed previously and illustrated in FIGS. 8 and 9. However, whereas second electrical actuator 342 of fuel injector 330 (FIG. 8) controlled the flow of hydraulic fluid to the top of conventional needle valve member 417, second electrical actuator 442 of fuel injector 430 (FIG. 10) controls the flow of actuation fluid exposed to the top of an HCCI needle valve member 507. However, as illustrated, first electrical actuator 432 performs in a similar manner to first electrical actuator 332, discussed previously. For instance, first electrical actuator 432 controls the flow of actuation fluid, preferably engine lubricating oil, to a control hydraulic surface on a spool valve member 455. When spool valve member 455 moves from its first, biased position to a second position, high pressure actuation fluid can act on a hydraulic surface 481 of an intensifier piston 480. Piston 480, together with plunger 483, can then act to pressurize fuel within fuel injector 430. While fuel injector 430 preferably utilizes engine lubricating oil as an actuation fluid, it should be appreciated that other fluids, such as fuel or coolant fluid, could also be utilized. For instance, it should be appreciated that with modifications to various fluid passages, fuel injector 430 could be part of an all fuel system in which fuel is used as both the working fluid and the injection fluid.

Returning now to fuel injector 430, a nested needle valve 500 includes an inner, HCCI needle valve member 507 and an outer, conventional needle valve member 517. Needle valve member 507, which is preferably a pin, provides a closing hydraulic surface 506 that is exposed to fluid pressure in an HCCI needle control chamber 502 that is connected to a pressure control passage 501. When second electrical actuator 442 is de-energized, closing hydraulic surface 506 is exposed to high pressure actuation fluid in a pressure control passage 501. It should be appreciated that if second electrical actuator 442 is similar to second electrical actuator 42 (FIG. 2c), pressure control passage 501 will be open to high pressure by a valve member attached to second electrical actuator 442. When second electrical actuator 442 is energized, closing hydraulic surface 506 is exposed to low pressure in pressure control passage 501. Once again it should be appreciated that if second electrical actuator 442 is similar to second electrical actuator 42 (FIG. 2c), the actuator valve member will be moved by actuator 442 to block pressure control passage 501 from high pressure fluid and open the same to a low pressure drain passage.

Needle valve member 507 also provides an opening hydraulic surface 510 that is exposed to fluid pressure in a nozzle chamber 509. Nozzle chamber 509 is fluidly connected to a nozzle supply passage 518 defined by injector body 431 by a connection passage 508 that is defined by conventional needle valve member 517. Closing hydraulic surface 506 and opening hydraulic surface 510 are preferably sized such that when high pressure is acting on closing hydraulic surface 506 in needle control chamber 502, needle valve member 507 will remain in, or move toward, a downward closed position, as shown. Similarly, these surfaces are preferably sized such that needle valve member 507 will be lifted to its open position by the fuel pressure in nozzle chamber 509 is above an HCCI valve opening pressure, and low pressure is acting on closing hydraulic surface 506.

When needle valve member 507 is in its downward position, an angular knife edge valve surface 521 of needle valve member 507 closes a flat valve seat 522 provided on needle valve member 517 to block HCCI nozzle outlets 526 from nozzle supply passage 518. When pressure control passage 501 is open to low pressure, an HCCI valve opening fuel pressure acting on opening hydraulic surface 510 in nozzle chamber 509 will lift needle valve member 507 to an open position. However, it should be appreciated that for this embodiment of the present invention, fuel is preferably supplied at a supply pressure higher than the HCCI valve opening pressure. Thus, injection pressure for an HCCI injection event can be equal to a medium fuel supply pressure.

When needle valve member 507 is in its open position, corresponding to the first configuration of fuel injector 430, valve surface 521 is away from valve seat 522 to open connection passage 508 to HCCI nozzle outlets 526 via spray passage 504. When needle valve member 507 is in this position, fuel spray via HCCI nozzle outlets 526 into cylinder 25 can commence. When fuel injector 430 is in this configuration, fuel spray into cylinder 25 is at a relatively small angle θ with respect to injector centerline 429 and cylinder centerline 27. As best illustrated in FIG. 11, the centerlines of HCCI nozzle outlets 526 preferably intersect. This orientation of HCCI nozzle outlets 526 is preferable because it is believed that collision of the flow streams into cylinder 25 could be beneficial in the atomization and mixing of fuel with air. However, it should be appreciated that the centerlines of these nozzle outlets need not intersect. In addition, it should be appreciated that while more than one HCCI nozzle outlet 526 has been illustrated, injector 430 could instead include only a single HCCI nozzle outlet.

Returning now to needle valve 500, conventional needle valve member 517 includes an opening hydraulic surface 520 that is exposed to fluid pressure in nozzle chamber 519. Needle valve member 517 is biased toward its downward, closed position by a biasing spring 511. Preferably, the relative sizes and strength of opening hydraulic surface 520, biasing spring 511 and closing hydraulic surface 506 of needle valve member 507 are such that needle valve member 517 will be lifted to its upward, open position when opening hydraulic surface 520 is exposed to intensified high pressure fuel in nozzle chamber 519, that corresponds to a conventional valve opening pressure, which is preferably substantially higher than both the fuel supply pressure and the HCCI valve opening pressure. In other words, the valve opening pressure of needle valve member 517 should be greater than that of needle valve member 507 such that needle valve member 507 will lift for the lower HCCI injection pressures. In addition, the conventional valve opening pressure will be relatively high to overcome the downward force of both biasing spring 511 and the high pressure fluid force acting on closing hydraulic surface 506 of needle valve member 507. Thus, the conventional injection event can occur without second electrical actuator 442 being activated. When needle valve member 517 is in its downward, biased position, nozzle outlets 528 are blocked. However, when needle valve member 517 is in its upward, open position, conventional nozzle outlets 528 are open and fuel spray into cylinder 25 can commence. When fuel injection is occurring via conventional nozzle outlets 528, recall that fuel injector 430 is in its second configuration. When fuel injector 430 is in this second configuration, fuel spray into cylinder 25 is in a second spray pattern corresponding to the relatively large angle α of conventional nozzle outlets 528 with respect to centerlines 27 and 429.

Note that while needle valve member 507 is also lifted by the upward movement of needle valve member 517, HCCI nozzle outlets 526 remains closed during the conventional injection event. This is due to a number of factors. When high pressure is acting on HCCI closing hydraulic surface 506, the HCCI needle valve member 507 will remain seated. It should be appreciated that because conventional needle valve member 517 must overcome the spring force of conventional biasing spring 111, as well as the fluid force acting on closing hydraulic surface 506 of needle valve member 507, opening hydraulic surface 520 should be sized appropriately so that conventional injection events only occur when fuel pressure is intensified by movement of intensifier piston 480. Thus, conventional needle valve member 517 will begin to move toward its open position, moving HCCI needle valve member 507 upward, while HCCI needle valve member 507 remains seated. In addition, the upward movement of HCCI needle valve member 507, and thus the upward movement of conventional needle valve member 117, is limited by injector body 431. Thus, once conventional needle valve member 517 reaches its upward position, HCCI needle valve member 507 is prevented from lifting away from conventional needle valve member 517. This embodiment permits HCCI injection events at a medium supply pressure, and conventional injection events at a high intensified pressure.

VI. FIGS. 12-15

Figure 12:
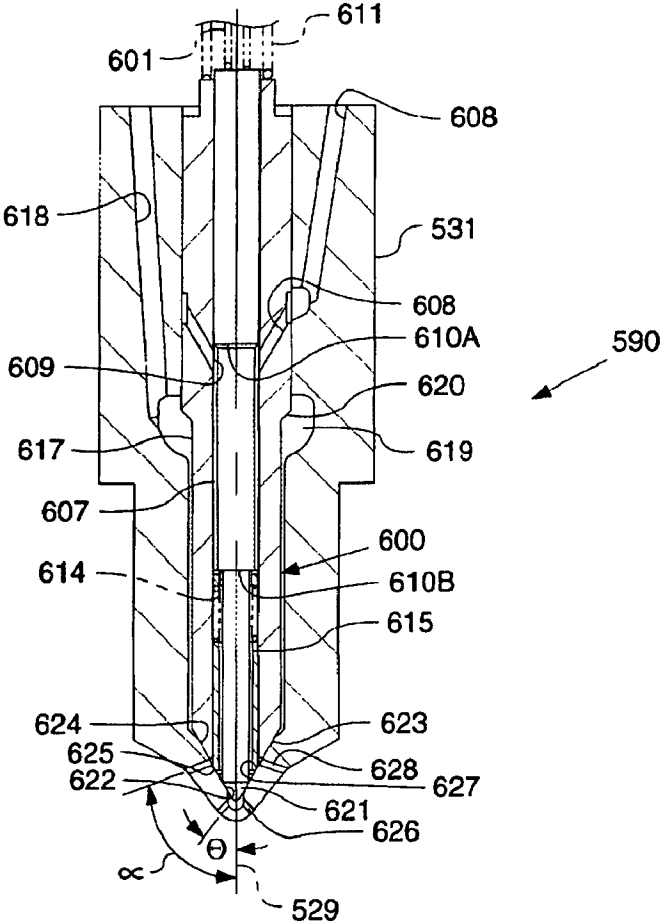
FIG. 12 is a diagrammatic sectioned side view of still another needle valve nozzle portion having a dual concentric needle according to the present invention.

Referring now to FIG. 12 there is illustrated a nozzle assembly 590 according to yet another embodiment of the present invention. Nozzle assembly 590 provides a needle valve assembly 600 that includes an HCCI needle valve member 607, a conventional needle valve member 617 and an inner sealing sleeve member 615. Needle valve 600 has been illustrated in a first position in which a set of HCCI nozzle outlets 626 and a set of conventional nozzle outlets 628, both of which are defined by injector body 531, are blocked. Needle valve 600 is movable from this first position to a second position in which HCCI nozzle outlets 626 are open and conventional nozzle outlets 628 are blocked. Needle valve 600 is also movable to a third position in which HCCI nozzle outlets 626 are blocked and conventional nozzle outlets 628 are open. As best illustrated in FIG. 12, inner sealing member 615 is biased toward a downward position by a biasing spring 614. Inner sealing member 615 is preferably maintained in this position throughout the operation of fuel injector 530, such that a valve surface 625 of inner sealing member 615 closes a conical valve seat 627 defined by injector body 530 to separate HCCI nozzle outlets 626 from conventional nozzle outlets 628.

When needle valve 600 is in its first position, HCCI needle valve member 607 and conventional needle valve member 617 are both in downward, closed positions, as shown. When needle valve member 607 is in its closed position, a valve surface 621 provided on needle valve member 607 closes a conical valve seat 622 defined by injector body 531. Similarly, when needle valve member 617 is in its closed position, a valve surface 623 provided on needle valve member 617 closes a conical valve seat 624 defined by injector body 531. Needle valve member 607 and needle valve member 617 are biased toward their closed positions by a biasing spring 601 and a biasing spring 611, respectively. Needle valve member 607 includes an opening hydraulic surface 610 that is exposed to fuel pressure in nozzle chamber 609. Nozzle chamber 609 is fluidly connected to a source of pressurized fuel via a nozzle supply passage 608. When fuel pressure acting on opening hydraulic surfaces 610A and 610B within nozzle supply chamber 609 exceeds the first valve opening pressure defined by the downward bias of biasing spring 601, needle valve member 607 is lifted to its open position, corresponding to the second position of needle valve 600. Recall that this second position of needle valve 600 corresponds to a first configuration of fuel injector 530. When fuel injector 30 is in this configuration, fuel spray into cylinder 25 is at a relatively small angle θ with respect to injector centerline 529 and cylinder centerline 29. However, depending upon the control strategy utilized for needle valve 600, the valve opening pressures for needle valve member 607 and needle valve member 617 could be the same or different, as illustrated below.

In addition to HCCI needle valve member 607, needle valve 600 also provides a conventional needle valve member 617. Needle valve member 617 is movable between a downward, closed position and an upward, open position, and is biased toward its closed position by a biasing spring 611. Needle valve member 617 provides an opening hydraulic surface 620 that is exposed to fuel pressure in a nozzle chamber 619. Nozzle chamber 619 is fluidly connected to fuel pressurization chamber 585 via a nozzle supply passage 618. When the fuel pressure acting on opening hydraulic surface 620 exceeds the downward force of biasing spring 611, needle valve member 617 is lifted to its open position, corresponding to the third position of needle valve 600. This third position of needle valve 600 corresponds to a second configuration of fuel injector 530. When fuel injector 530 is in this second configuration, fuel spray into cylinder 25 is in a second spray pattern corresponding to the relatively large angle α of conventional nozzle outlets 628 with respect to centerlines 27 and 529.

It should be appreciated that control of needle valve 600 can be carried out in a number of different manners. For instance, referring in addition to FIG. 13 there is shown a schematic representation of a fuel injector 530 according to a first control strategy for needle valve 600. It should be appreciated that only those components of fuel injector 530 that are integral to the control of needle valve 600 have been represented. Injector 530 includes a first electrical actuator 532 and a second electrical actuator 542. First electrical actuator 532 is preferably a two-position solenoid and second electrical actuator 542 is preferably a three-position check control actuator. However, it should be appreciated that other suitable actuators, such as piezoelectric actuators, could be substituted.

First electrical actuator 532 controls actuation fluid pressure on a control surface of a spool valve member 555. It should be appreciated that spool valve member 555 could be similar to spool valve member 55, as illustrated in FIG. 2. In this case, spool valve member 555 could be movable between a biased, upward position and a downward position. A hydraulic surface 581 of piston 580 could be exposed to low pressure when spool valve member 555 is in its upward position and it could be exposed to high pressure actuation fluid when spool valve member 555 is in its downward position. It should be appreciated that spool valve member 555 could also be oriented in a different manner, such that hydraulic surface 581 of piston 580 is exposed to high pressure actuation fluid when spool valve member 555 is in its upward position and exposed to low pressure when spool valve member 555 is in its downward position.

Regardless of the orientation of spool valve member 555, it should be appreciated that piston 580 and plunger 583 move toward their advanced positions when hydraulic surface 581 is exposed to high pressure actuation fluid. When piston 580 and plunger 583 advance, fuel within fuel injector 530 is pressurized. Pressurized fuel can be blocked by second electrical actuator 542 or directed to one of HCCI nozzle control chamber 609 or conventional nozzle control chamber 619. In other words, when second electrical actuator 542 is in a first position, pressurized fuel is blocked from exiting fuel injector 530 via either HCCI nozzle outlets 626 or conventional nozzle outlets 628. When second electrical actuator 542 is in a second position, pressurized fuel can flow into HCCI nozzle chamber 609 via HCCI nozzle supply passage 608. When the pressure of fuel in HCCI nozzle chamber 609 exceeds the downward force of biasing spring 601, HCCI needle valve member 607 is lifted to its upward position. Pressurized fuel can now spray out of fuel injector 530 via HCCI nozzle outlets 626. When second electrical actuator 542 is in a third position, pressurized fuel can flow into conventional nozzle chamber 619 via nozzle supply passage 618. When the pressure of fuel in conventional nozzle chamber 619 exceeds the downward force of biasing spring 611, conventional needle valve member 617 is lifted to its upward position allowing fuel spray into cylinder 25 via conventional nozzle outlets 628.

Figure 13:
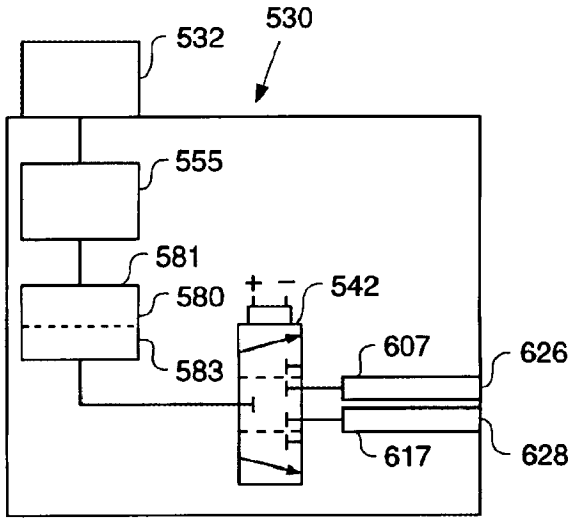
FIG. 13 is a schematic representation of a fuel injector including the nozzle portion of FIG. 12.
Figure 14:
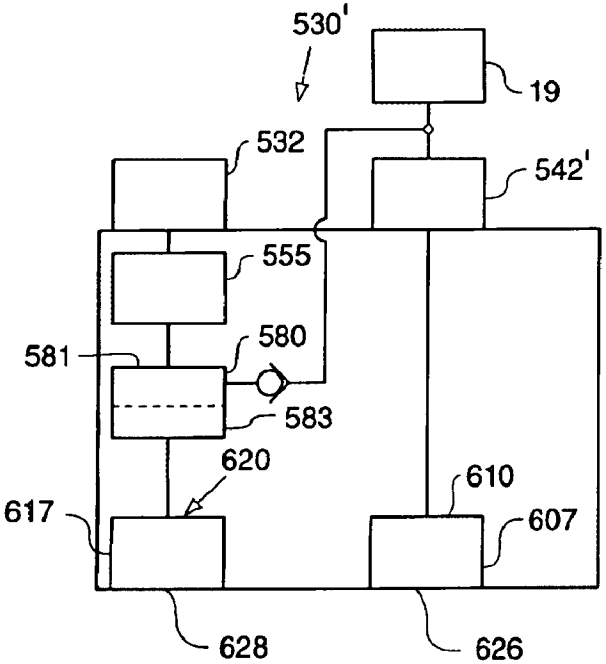
FIG. 14 is a schematic representation of another fuel injector including the nozzle portion of FIG. 12.

Referring now to FIG. 14 there is illustrated a schematic representation of a fuel injector 530' according to another control strategy. Fuel injector 530' includes a first electrical actuator 532 and a second electrical actuator 542'. First electrical actuator 532 is a two-position actuator that controls intensified injection via conventional nozzles 628. Second electrical actuator 542' is a two-position actuator that controls injection via HCCI nozzles 626. As with the FIG. 13 control strategy, first electrical actuator 532 controls the pressure of hydraulic fluid acting on a control surface of spool valve 555. However, unlike the FIG. 13 embodiment, fuel injection via HCCI nozzles 626 is controlled only by fuel transfer pump pressure, as directed by second electrical actuator 542'. Thus, when second electrical actuator 542' is de-activated, such as between HCCI injection events, opening hydraulic surface 610 of HCCI needle valve member 607 is blocked from fuel line 20, and no injection via HCCI nozzle outlets 626 can occur. However, when second electrical actuator 542' is activated, opening hydraulic surface 610 of HCCI needle valve member 607 is exposed to fuel pressure in fuel line 20 (FIG. 1a), which is sufficient to move HCCI needle valve member 607 to its upward, open position to allow fuel injection via HCCI nozzle outlets 626. It should be appreciated that because fuel injected during the HCCI injection event is being supplied directly from fuel line 20, this will be a relatively low pressure injection event. In other words, because fuel for this injection event is being supplied directly from fuel line 20, needle valve member 607 preferably has a relatively low valve opening pressure, such that needle valve member 607 will be lifted to its open position against the spring bias force when nozzle chamber 609 is fluidly connected to fuel line 20.

Returning to first electrical actuator 532, and the conventional injection event, when first electrical actuator 532 is de-energized, such as between conventional injection events, spool valve member 555 is in a first position fluidly connecting a hydraulic surface of piston 580 to low pressure. In this condition, piston 580 and plunger 583 are in their retracted positions and fuel acting on opening hydraulic surface 620 is not sufficient to move conventional needle valve member 617 to its upward, open position. When first electrical actuator 532 is energized, however, spool valve member 555 is in a second position exposing the hydraulic surface of piston 580 to high pressure, to allow piston 580 and plunger 583 to move to their advanced positions to pressurize fuel within fuel injector 530'. When fuel pressure exceeds a valve opening pressure, conventional needle valve member 617 is lifted to its open position and fuel injection via conventional nozzle outlets 628 can commence. The conventional valve opening pressure is thus preferably substantially higher than fuel transfer pressure.

Figure 15:
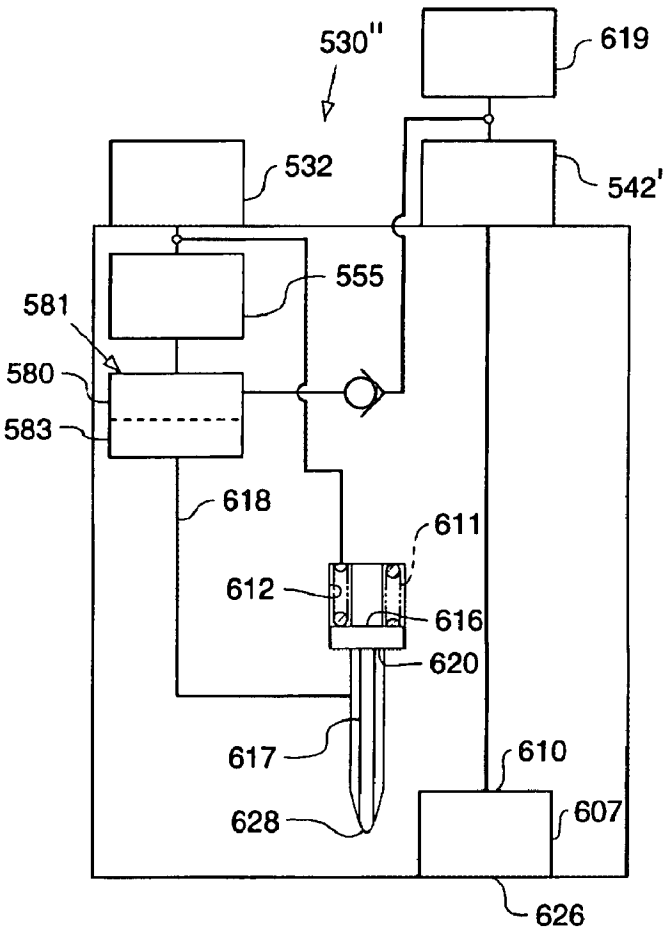
FIG. 15 is a schematic representation of yet another fuel injector including the nozzle portion of FIG. 12.

Referring now to FIG. 15, there is illustrated yet another schematic representation of a control strategy for fuel injector 530". Note that in this embodiment, injection via HCCI nozzle outlets 626 is controlled by two-position actuator 542' as described for the FIG. 14 control strategy. However, this embodiment differs from the FIG. 14 embodiment in that conventional needle valve member 617 now includes a closing hydraulic surface 616 that is exposed to fluid pressure in a conventional needle control chamber 612. Fluid pressure in needle control chamber 612 is controlled by first electrical actuator 532. Thus, when first electrical actuator 532 is de-energized, such as between conventional injection events, high pressure actuation fluid is applied to both a control surface on spool valve member 555 and closing hydraulic surface 616. While fuel injector 530" preferably utilizes oil as an actuation fluid, it should be appreciated that other fluids, such as fuel, could instead be used. Preferably, spool valve member 555 is in a position exposing hydraulic surface 581 of piston 580 to low pressure when first electrical actuator 532 is de-energized, thus preventing pressurization of fuel within fuel pressurization chamber 85 (FIG. 2). In addition, however, it is preferable that closing hydraulic surface 616 and biasing spring 611 be sized and positioned such that conventional needle valve member 617 will remain in, or move toward, its downward, closed position when closing hydraulic surface 616 is exposed to high pressure, regardless whether the fuel pressure acting on opening hydraulic surface 620 is at injection levels. When first electrical actuator 532 is energized, spool valve member 555 and closing hydraulic surface 616 are exposed to low pressure. Once the pressure of fuel acting on opening hydraulic surface 620 exceeds a valve opening pressure, fuel injection via conventional nozzle outlets 626 can commence. It should be appreciated that this injection event is a relatively high pressure injection event in comparison with the HCCI injection event, as with the FIG. 14 embodiment. In other words, because the fuel being injected via conventional nozzle outlets 628 has been pressure intensified by piston 580 and plunger 583, the injection pressure of fuel being injected during the conventional injection event will be greater than the injection pressure of fuel being injected during the HCCI injection event, which is at a medium fuel supply pressure from source 619, which could be a common fuel rail.

VII. FIGS. 16-18

Figure 17:
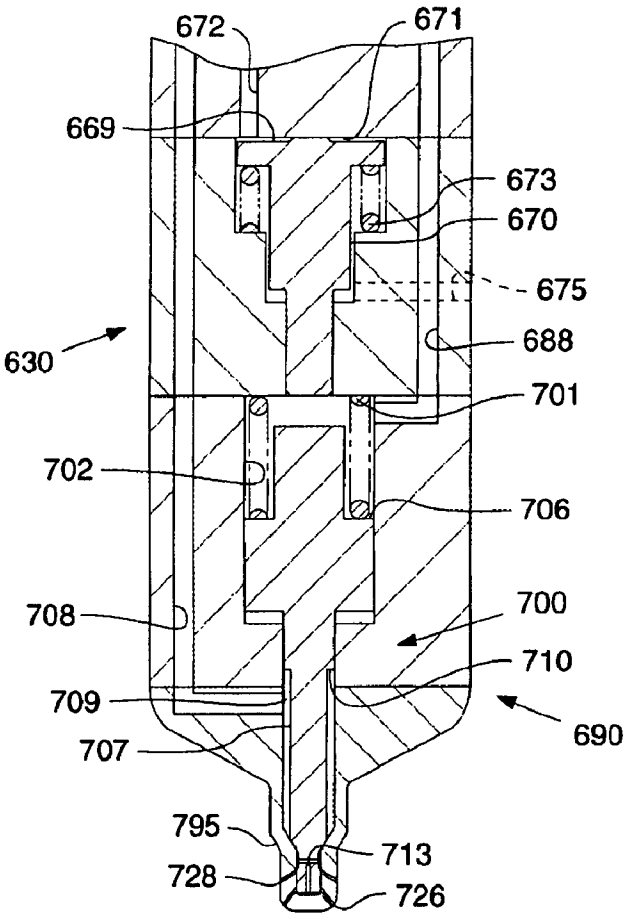
FIG. 17 is a diagrammatic sectioned side view an alternate actuator portion for use with the fuel injector of FIG. 16.
Figure 16:
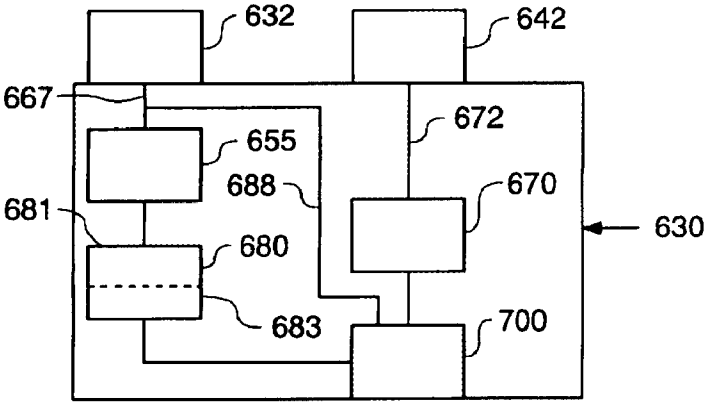
FIG. 16 is a schematic representation of a fuel injector according to still another embodiment of the present invention.

Referring now to FIGS. 16-18, there is illustrated a fuel injector 630 according to yet another embodiment of the present invention, as well as a nozzle valve assembly 690 for use with fuel injector 630. Once again, fuel injector 630 preferably includes a number of components similar to fuel injector 30, as illustrated in FIG. 2. For instance, fuel injector 630 includes a first electrical actuator 632 that controls fluid pressure in both a variable pressure passage 667 and a pressure communication passage 688. As illustrated in FIG. 16, fluid pressure in variable pressure passage 667 acts on a control surface of spool valve member 655, while fluid pressure in pressure communication passage 688 acts on a closing hydraulic surface 706 of needle valve member 707. Preferably, first electrical actuator 632 is a two-position actuator which controls the flow of pressurized engine lubricating oil to act on these components. However, it should be appreciated that first electrical actuator 632 could be another suitable actuator, such as a piezo-electric actuator. In addition, it should be further appreciated that another suitable actuation fluid, such as fuel, could be used. When first electrical actuator 632 is de-energized, such as between injection events, spool valve member 655 is in a first position exposing a hydraulic surface 681 of an intensifier piston 680 to low pressure actuation fluid. In addition, pressure communication passage 688 is open to high pressure actuation fluid, such that high pressure is acting on closing hydraulic surface 706. When first electrical actuator 632 is energized, spool valve member 655 is moved to a second position in which high pressure actuation fluid can act on hydraulic surface 681. When this occurs, piston 681, as well as a plunger 683, can move to advanced positions to pressurize fuel within fuel injector 630. Additionally, when first electrical actuator 632 is energized, closing hydraulic surface 706 is exposed to low pressure via pressure communication passage 688.

Returning to fuel injector 630, a second electrical actuator 642 is included which controls fluid pressure acting on a hydraulic surface 669 of a stop component 670, which is exposed to fluid pressure in a stop control chamber 671 via fluid transfer passage 672. Second electrical actuator 642 is also preferably a two-position actuator, however, once again another suitable actuator, such as a piezo-electric actuator, could be substituted. Preferably, second electrical actuator 642 controls the flow of fuel from a fuel pressurization chamber 85 (FIG. 2) to stop control chamber 671, however, another suitable actuation fluid could be utilized, such as pressurized engine lubricating oil. When second electrical actuator 642 is de-energized, such as between injection events, stop control chamber 671 is open to low pressure via fluid transfer passage 672. When low pressure is acting on hydraulic surface 669, stop component 670 is in a retracted position, as illustrated. Stop component 670 is biased toward this retracted position by a biasing spring 673. When second electrical actuator 632 is energized, stop control chamber 671 is open to high pressure via fluid transfer passage 672. When high pressure is acting on hydraulic surface 669, stop component 670 can move to an advanced position against the force of biasing spring 673. As illustrated in FIG. 17, a drain passage 675 is provided to allow evacuation of fluid that has migrated from stop control chamber 671 around stop component 670.

Figure 18C:
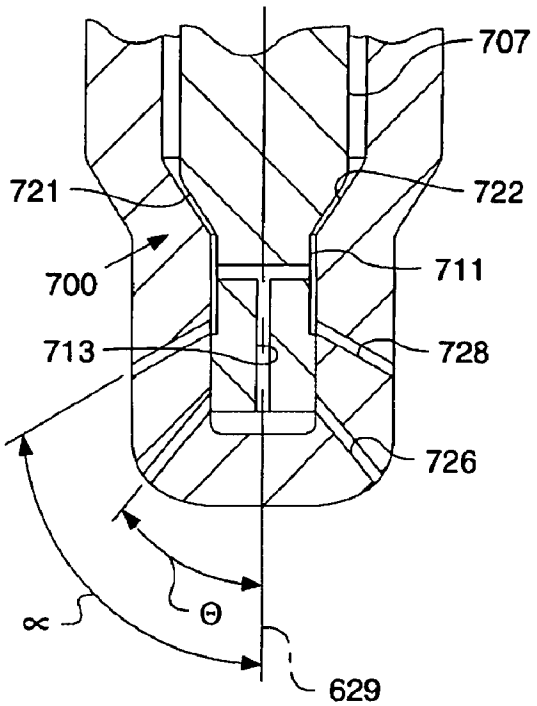
FIGS. 18a-c are diagrammatic sectioned side views of a single needle valve nozzle tip portion for use with the fuel injector of FIG. 16.
Figure 18B:
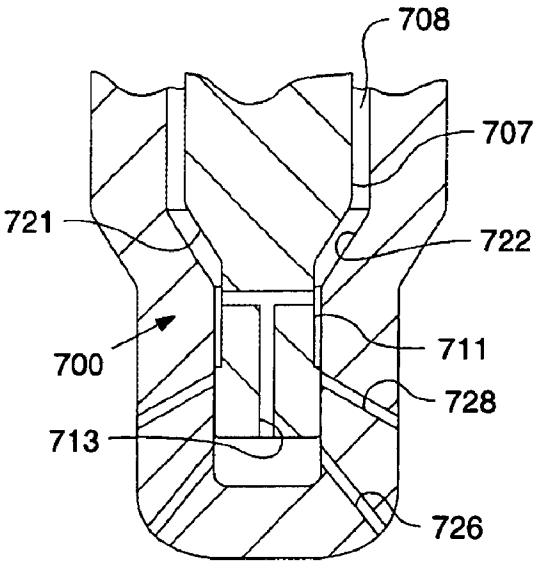
Figure 18A:
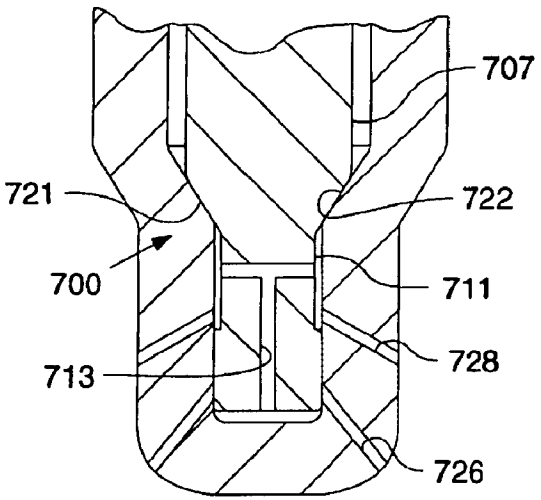

Returning to nozzle assembly 690, a needle valve 700 is provided that is preferably a three-position needle valve and includes a single needle valve member 707. Needle valve member 707 includes an opening hydraulic surface 710 that is exposed to fuel pressure in a nozzle chamber 709 that is fluidly connected to fuel pressurization chamber 85 via a nozzle supply passage 708. In addition, needle valve member 707 defines a T-shaped nozzle supply passage 713, that can fluidly connect nozzle supply passage 708 to either a set of HCCI nozzle outlets 726 or a set of conventional nozzle outlets 728, that are defined by tip 795. Needle valve member 707 is movable between a first, downward position (FIG. 18a), a second, maximum lift position (FIG. 18b), and a third, intermediate position (FIG. 18c). When needle valve member 707 is in its first position, as illustrated, it is out of contact with stop component 670. When needle valve member 707 is in its second position, however, it is in contact with stop component 670, which is in its retracted position. Similarly, when needle valve member 707 is in its third position, it is also in contact with stop component 670, which is in its advanced position. Needle valve member 707 is preferably biased toward its first position by a biasing spring 701. In addition, the relative sizes and strength of closing hydraulic surface 706, opening hydraulic surface 710 and biasing spring 701 are preferably such that needle valve member 707 will remain in its first position when closing hydraulic surface 706 is exposed to high pressure fluid in needle control chamber 702, regardless of the pressure of fuel acting on opening hydraulic surface 710.

When needle valve member 707 is in its downward, closed position, such as when first electrical actuator 632 is de-energized, nozzle supply passage 713 is blocked from fluid communication with nozzle supply passage 708 due to the closure of seat 722 by valve surface 721. Thus, fuel injection via either HCCI nozzle outlets 726 or conventional nozzle outlets 728 is prevented. When needle valve member 707 is in its maximum lift position, such as when first electrical actuator 632 is energized and second electrical actuator 642 is de-energized to maintain stop component 670 in its retracted position, HCCI nozzle outlets 726 are open to nozzle supply passage 708 via nozzle supply passage 713. When needle valve member 707 is in its maximum lift position, this corresponds to a first configuration of fuel injector 630. When fuel injector 630 is in this configuration, fuel spray into cylinder 25 is at a relatively small angle θ with respect to injector centerline 629 and cylinder centerline 27. As best illustrated in FIG. 18c, HCCI nozzle outlets 726 are preferably defined such that θ is relatively small for this embodiment of the present invention. It should be appreciated from FIG. 17 that conventional nozzle outlets 728 are briefly opened to nozzle supply passage 708 via an annulus 711 that is defined by needle valve member 707 when needle valve member 707 is moving toward its maximum lift position.

When needle valve member 707 is in its intermediate lift position, such as when first electrical actuator 632 is energized and second electrical actuator 642 is energized such that stop component 670 is moved to its advanced position, annulus 711 is open to nozzle supply passage 708, such that fuel can spray out of conventional nozzle outlets 728 into cylinder 25. However, while needle supply passage 713 is open to nozzle supply passage 708 when needle valve member 707 is in this position, HCCI nozzle outlets 726 remain blocked by needle valve member 707, such that fuel spray into cylinder 25 via HCCI nozzle outlets 726 does not occur. When needle valve member 707 is in this intermediate lift position, this corresponds to a second configuration of fuel injector 630. When fuel injector 630 is in this second configuration, fuel spray into cylinder 25 is in a second spray pattern corresponding to the relatively large angle α of conventional nozzle outlets 128 with respect to centerline 629, as best illustrated in FIG. 18c.

Industrial Applicability

I. FIGS. 2-4

Referring to FIGS. 1-4, prior to an injection event, first actuator 32 and second actuator 42 are de-energized, low pressure in fuel injector 30 prevails at most locations and spool valve 55 is in its upward position opening actuation fluid passage 68 to low pressure passage 52, via low pressure annulus 58. With low pressure acting on hydraulic surface 81, piston 80 and plunger 83 are in their retracted positions. HCCI needle control chamber 102 is exposed to high pressure via pressure communication passage 88 such that HCCI needle valve member 107 is in its downward, closed position closing HCCI nozzle outlet 126. Conventional needle valve member 117 is in its downward biased position closing conventional nozzle outlets 128.

Prior to the compression stroke of piston 26, electronic control module 17 evaluates engine 10 operating conditions to determine if engine 10 is operating in a conventional mode, an HCCI mode or a transitional mode. Engine 10 can operate in a HCCI mode, such asunder a low load condition. In other words, injector 30 will only perform an HCCI injection event, preferably at or near the beginning of the compression stroke of piston 26. If engine 10 is operating under a high load condition, injector 30 will preferably operate in a conventional mode. In other words, injector 30 will perform only a conventional injection, preferably at or near the end of the compression stroke of piston 26. Finally, if engine 10 is determined to be operating under a transitional load condition, injector 30 will operate in a mixed mode. When injector 30 is operating in the mixed mode, both an HCCI injection and the conventional injection will be performed during the compression stroke of piston 26. In other words, injector 30 will perform an HCCI injection when piston 26 is relatively close to the bottom dead center position of its compression stroke and will then perform a conventional injection when piston 26 is relatively close to the top dead center position of the same compression stroke. The remainder of operation of this embodiment of injector 30 will be described for a transitional load operating condition of engine 10, corresponding to operation of fuel injector 30 in a mixed mode.

Referring to FIG. 2B, just prior to the beginning of the HCCI injection event, when engine cylinder 26 is relatively far from its top dead center position, first electrical actuator 32 is energized and valve member 37 is moved upward by armature 35 against the force of biasing spring 33 to close high pressure seat 39. Variable pressure passage 67 and pressure communication passage 88 are now fluidly connected to low pressure passage 40. With fluid pressure acting on control surface 65 in spool cavity 65 now low, the high pressure acting on high pressure surface 56 is sufficient to overcome the force of biasing spring 60, and spool valve member 55 moves to its advanced position blocking actuation fluid passage 68 from low pressure passage 52 and opening it to high pressure passage 51 via high pressure annulus 57. High pressure acting on hydraulic surface 81 in actuation fluid passage 68 causes piston 80 to begin to move toward its advanced position. As piston 80 advances, plunger 83 moves in a corresponding manner. This advancing movement of piston 80 and plunger 83 is sufficient to pressurize the fuel in fuel pressurization chamber 85 and HCCI nozzle supply passage 108 to injection levels.

Recall that pressure communication passage 88 is also open to low pressure passage 40, thus exposing closing hydraulic surface 106 of HCCI needle valve member 107 to low pressure in needle control chamber 102. Therefore, once the pressure of fuel within nozzle chamber 109 exceeds an HCCI valve opening pressure, HCCI needle valve member 107 is lifted to its open position, corresponding to the first configuration of fuel injector 30. HCCI nozzle outlet 126 is now fluidly connected to nozzle supply passage 108 and nozzle chamber 109. However, because high pressure fuel is acting on closing hydraulic surface 116, conventional needle valve member 117 remains in its downward, closed position. Pressurized fuel can now spray into cylinder 25 via HCCI nozzle outlet 126. Referring again to FIG. 1a, recall that fuel will be sprayed into cylinder 25 in a first spray pattern with respect to cylinder centerline 27 when fuel injector 30 is injecting fuel via HCCI nozzle outlet 26. This fuel spray is preferably at a relatively small angle, here zero degrees, with respect to cylinder centerline 27.

When the desired amount of fuel has been injected for the HCCI injection event, first electrical actuator 32 is de-energized and valve member 37 is returned to its advanced position under the force of biasing spring 33. Variable pressure passage 67 and pressure communication passage 88 are now opened to high pressure passage 51. With high pressure acting on closing hydraulic surface 106, needle valve member 107 is returned to its closed position to block nozzle outlet 126 from nozzle supply passage 108 and end fuel spray into cylinder 25.

Once nozzle outlet 126 is closed, residual high pressure in actuation fluid passage 68 is sufficient to move pressure relief valve 70 upward away from seat 72 to fluidly connect actuation fluid passage 68 to pressure relief passage 75. Pressure relief valve 70 can therefore help vent high pressure actuation fluid from actuation fluid passage 68 to prevent pressure spikes from causing undesired secondary injections. At the same time, the upward movement of pressure relief valve 70 causes pin 71 to aid spool valve member 55 in returning to its upward position. Recall that control surface 63 is again exposed to high pressure in spool cavity 65, causing spool valve member 55 to once again be hydraulically balanced such that it can return to its upward position under the force of biasing spring 60, in addition to the upward force of pin 71. When spool valve member 55 begins to retract, piston 80 and plunger 83 end their downward movement. However, as a result of hydraulic locking, they do not immediately begin to retract. Once spool valve member 55 is returned to its upward position, actuation fluid passage 68 is blocked from fluid communication with high pressure passage 51 and fluidly connected to low pressure passage 52, which further reduces the pressure within actuation fluid passage 68. Piston 80 and plunger 83 can now move toward their retracted positions. As plunger 83 retracts, fuel from fuel source 19 can be drawn into fuel pressurization chamber 85 via fuel inlet 86 past check valve 87. Used actuation fluid is displaced into the drain 52.

With the HCCI injection event now complete, piston 26 continues to advance toward its top dead center position. Fuel and air within cylinder 25 begin to combine into a homogeneous mixture. In addition, fuel injector 30 prepares for the conventional injection event. Recall that fuel injector 30 will preferably only perform both the HCCI injection event and the conventional injection event during the same piston stroke when engine 10 is operating in a mixed mode, such as during a medium load condition. To initiate the conventional injection event, as cylinder piston 26 approaches its top dead center position, second electrical actuator 42 is energized and valve member 47 is moved to its retracted position by armature 45 to close high pressure seat 49 and open conventional needle control chamber 112 to relatively low pressure in fuel line 20 via pressure control line 77. However, conventional needle valve member 117 remains in its downward, closed position under the force of biasing spring 111. First electrical actuator 32 is re-energized, and valve member 37 is once again moved to its retracted position by armature 35 closing high pressure seat 39. Spool cavity 65 is again open to low pressure passage 40 via variable pressure passage 67. In addition, pressure communication passage 88 is also opened to low pressure passage 40, thus exposing HCCI closing hydraulic surface 106 to low pressure in HCCI needle control chamber 102. However, as with conventional needle valve member 117, HCCI needle valve member 107 remains in its downward, closed position under the force of biasing spring 101.

When spool cavity 65 is opened to low pressure passage 40, spool valve member 55 is no longer hydraulically balanced and is moved to its advanced position under the force of high pressure fluid acting on high pressure surface 56. Actuation fluid passage 68 is now open to high pressure passage 51 via high pressure annulus 57. With high pressure acting on hydraulic surface 81 in actuation fluid passage 68, piston 80 and plunger 83 begin to move toward their advanced positions. This movement, however raises the pressure of fuel within fuel pressurization chamber 85 and nozzle supply passage 118 to injection pressure levels for the conventional injection event.

Once the pressure of fuel within nozzle supply passage 118 and nozzle chamber 119 reaches the conventional valve opening pressure, which is less than the HCCI valve opening pressure, conventional needle valve member 117 is lifted to its upward position to open conventional nozzle outlets 128, corresponding to the second configuration of fuel injector 30. When conventional needle valve member 117 is lifted, HCCI needle valve member 107 is also moved to its upward position. However, because needle valve member 107 is lifted with needle valve member 117, rather than being lifted away from HCCI valve seat 122, HCCI nozzle outlet 126 remains blocked. HCCI needle valve member 107 is not lifted independently of conventional needle valve member 117 because the conventional valve opening pressure heeded to lift conventional needle valve member 117 to its upward position is lower than the valve opening pressure required to lift HCCI needle valve member 107 against the force of biasing spring 101. Recall that the differing valve opening pressures is preferably a result of the difference in the preloads and strengths of biasing springs 101, 111, as well as from a difference in the relative sizes of opening hydraulic surfaces 110, 120. In addition, once conventional needle valve member 117 reaches its upward position, HCCI needle valve member 107 is prevented from lifting away from HCCI valve scat 122 by stop pin 105. In order to ensure that HCCI nozzle outlet 126 remains closed during a conventional injection event, conventional needle valve member 117 reaches its fully open position before fuel pressure reaches the HCCI valve opening pressure. Thus, fuel can spray into cylinder 25 via conventional nozzle outlets 128, but not from HCCI nozzle outlet 126. Recall that this fuel injection occurs when cylinder piston 26 is relatively close to its top dead center position. Referring again to FIG. 1b, recall that fuel injection via conventional nozzle outlets 128 occurs in a second spray pattern with respect to cylinder centerline 27. As illustrated, this second spray pattern corresponds to fuel spray at a relatively large angle with respect to cylinder centerline 27.

When the desired amount of fuel has been injected via conventional nozzle outlets 128, first electrical actuator 32 is de-energized and valve member 37 is returned to its advanced position by biasing spring 33 closing low pressure seat 38. This exposes closing hydraulic surface 116 of conventional needle valve member to high pressure activation fluid. HCCI needle control chamber 102 remains open to high pressure fuel via pressure communication passage 88. The downward force exerted on needle valve members 107 and 117, by pressurized fuel in needle control chamber 102 pressured activation fluid in chamber 112, and the biasing forces from springs 101 and 111, is sufficient to move HCCI needle valve member 107 and conventional needle valve member 117 downward to their closed positions to end the injection event. Second electrical actuator 42 remains de-energized to allow valve member 47 to return to its advanced position under the force of biasing spring 43, opening conventional needle control chamber 112 to high pressure in control supply line 76 via control pressure line 77, thus exposing conventional closing hydraulic surface 116 to high pressure.

Once nozzle outlet 126 is closed, residual high pressure in actuation fluid passage 68 is sufficient to move pressure relief valve 70 upward away from seat 72 to fluidly connect actuation fluid passage 68 to pressure relief passage 75. Pressure relief valve 70 can therefore help vent high pressure actuation fluid from actuation fluid passage 68 to prevent pressure spikes from causing undesired secondary injections. At the same time, the upward movement of pressure relief valve 70 causes pin 71 to aid spool valve member 55 in returning to its upward position. Recall that control surface 63 is again exposed to high pressure in spool cavity 65, causing spool valve member 55 to once again be hydraulically balanced such that it can return to its upward position under the force of biasing spring 60, in addition to the upward force of pin 71. When spool valve member 55 begins to retract, piston 80 and plunger 83 end their downward movement, however, as a result of hydraulic locking they do not immediately begin to retract. Once spool valve member 55 is returned to its upward position, actuation fluid passage 68 is blocked from fluid communication with high pressure passage 51 and fluidly connected to low pressure passage 52, which further reduces the pressure within actuation fluid passage 68. Piston 80 and plunger 83 can now move toward their retracted positions. As plunger 83 retracts, fuel from fuel source 19 can be drawn into fuel pressurization chamber 85 via fuel inlet 86 past check valve 87. Used actuation fluid is displaced into the drain 52.

Upon conclusion of the conventional injection event, engine 10 prepares for the subsequent fuel injection event. Combustion in cylinder 25 drives piston 26 downward for its power stroke. Piston 26 then performs its exhaust and intake strokes in preparation for the next injection event in a conventional manner. Electronic control module 17 evaluates the operation condition of engine 10 to determine a desired mode of operation for fuel injector 30 during the subsequent injection event. If the operating condition of engine 10 has changed, fuel injector 30 could instead operate in either an HCCI mode or a conventional mode for the subsequent injection event.

II. FIG. 5

Referring now to the FIG. 5, operation of fuel injector 30 will be described for this alternate embodiment of needle valve 200 for a mixed mode fuel injection event. Prior to an injection event, first electrical actuator 32 is de-energized such that valve member 37 is closing low pressure seat 38 and second electrical actuator 42 is de-energized such that valve member 47 is closing low pressure seat 48. Low pressure in most locations of fuel injector 30 prevails and spool valve member 55 is in its upward position opening actuation fluid passage 68 to low pressure passage 52 via low pressure annulus 58, piston 80 and plunger 83 are in their retracted positions, and HCCI needle valve member 207 and conventional needle valve member 217 are in their respective downward closed positions. As piston 26 begins to retract from its bottom dead center position of its compression stroke, the injection event is initiated.

To initiate the HCCI injection event, first electrical actuator 32 is energized and valve member 37 is moved to close high pressure seat 39 by armature 35. Variable pressure passage 67 and pressure communication passage 88 are now fluidly connected to low pressure passage 40. With pressure in spool cavity 65 now low, the high pressure acting on high pressure surface 56 is sufficient to overcome the force of biasing spring 60, and spool valve member 55 moves to its advanced position blocking actuation fluid passage 68 from low pressure passage 52 and opening it to high pressure passage 51 via high pressure annulus 57. High pressure acting on hydraulic surface 81 in actuation fluid passage 68 causes piston 80 to begin to move toward its advanced position. As piston 80 advances, plunger 83 moves in a corresponding manner. It should be appreciated that because HCCI nozzle outlets 226 are still closed, piston 80 and plunger 83 only advance a small distance at this time. However, this advancing movement of piston 80 and plunger 83 is sufficient to pressurize the fuel in fuel pressurization chamber 85 and nozzle supply passage 218.

Recall that pressure communication passage 88 is also open to low pressure passage 40, thus exposing closing hydraulic surface 206 of HCCI needle valve member 207 to low pressure in needle control chamber 202. Opening hydraulic surface 210 is exposed to fuel pressure in nozzle chamber 209 which is fluidly connected to nozzle supply passage 218 via nozzle supply passage 208. Once the pressure of fuel within nozzle chamber 209 exceeds a valve opening pressure, HCCI needle valve member 207 is lifted to its open position, fluidly connecting HCCI nozzle outlets 226 with nozzle supply passage 208. Pressurized fuel can now spray into cylinder 25 via HCCI nozzle outlets 226 in a first spray pattern with respect to cylinder centerline 27 (FIG. 1a). Recall that this spray pattern corresponds to fuel spray at a small angle, with respect to cylinder centerline 27. As Illustrated, piston 26 is still relatively far from its top dead center position when this HCCI injection event occurs.

When the desired amount of fuel has been injected for the HCCI injection event, first electrical actuator 32 is de-energized and valve member 37 is returned to its advanced position under the force of biasing spring 33. Variable pressure passage 67 and pressure communication passage 88 are now opened to high pressure passage 51. With high pressure acting on closing hydraulic surface 206, needle valve member 207 is returned to its closed position to block nozzle outlets 226 from nozzle supply passage 208 and end the injection event. At the conclusion of the HCCI injection event, various components of fuel injector 30 reset themselves in preparation for the next injection event, as described for the previous embodiment of the present invention. However, if a subsequent injection event is close in time, the injector may not reset itself. Piston 80 and plunger 83 return to their retracted positions and fuel is drawn into fuel pressurization chamber 85 with the retracting movement of plunger 83 for the next injection event. In addition, piston 26 continues to advance toward its top dead center position while fuel and air within cylinder 25 begin to combine into a homogeneous mixture.

Recall that the HCCI injection event preferably occurs while piston 26 is at or near bottom dead center position of its compression stroke. When engine 10 is operating in a mixed mode condition, injector 30 also performs a conventional injection event when piston 26 is at or near its top dead center position. Just prior to the desired start of the conventional injection event, when piston 26 is approaching its top dead center position, second electrical actuator 42 is energized and valve member 47 is moved to close high pressure seat 49 and open conventional needle control chamber 212 to low pressure. First electrical actuator 32 is then re-energized and valve member 37 is moved to close high pressure seat 39. Spool cavity 65 is now re-opened to low pressure passage 40 via variable pressure passage 67. With low pressure acting on control surface 63, the high pressure acting on high pressure surface 56 is sufficient to move spool valve member 55 to its downward position. Actuation fluid passage 68 is now blocked from low pressure passage 52 and open to high pressure passage 51 via low pressure annulus 58.

With high pressure again acting on hydraulic surface 81, piston 80 and plunger 83 begin to move toward their advanced positions. However, because HCCI nozzle outlets 226 and conventional nozzle outlets 228 are closed, piston 80 and plunger 83 only move a slight distance. As with the HCCI injection event, this distance is sufficient to pressurize the fuel within fuel pressurization chamber 85, nozzle chamber 209 and nozzle chamber 219 to injection pressures. With low pressure now acting on closing hydraulic surface 216, conventional needle valve member 217 is raised to its open position once fuel pressure within nozzle chamber 209 exceeds its valve opening pressure. Recall that the various sizes and strengths of conventional opening hydraulic surface 220, HCCI opening hydraulic surface 210, conventional closing hydraulic surface 216, HCCI closing hydraulic surface 206, conventional biasing spring 211 and HCCI biasing spring 201 are preferably such that the conventional valve opening pressure will be reached before the HCCI valve opening pressure when low pressure is acting on both closing hydraulic surface 206 and closing hydraulic surface 216. In addition, recall that stop pin 205 prevents HCCI needle valve member 207 from lifting away from conventional needle valve member 217 once conventional needle valve member reaches its upward position. This will prevent HCCI nozzle outlets 226 from opening during the conventional injection event. Thus, while HCCI needle valve 207 will be lifted to its upward position when conventional needle valve member 217 opens, HCCI nozzle outlets 226 will remain closed because HCCI needle valve member 207 does not lift upward independently of conventional needle valve member 217 to open valve seat 222.

Recall that fuel injection via conventional nozzle outlets 228 occurs in a second spray pattern with respect to cylinder centerline 27 (FIG. 1b). This second spray pattern is at a relatively large angle with respect to cylinder centerline 27. Once the desired amount of fuel has been injected for the conventional injection event, first electrical actuator 32 is de-energized and valve member 37 is returned to its biased position closing low pressure seat 38. Once pressure communication passage 88 is open to high pressure passage 51, the high pressure acting on HCCI closing hydraulic surface 206, in combination with the respective forces of biasing springs 201 and 211, is sufficient to move both HCCI needle valve member 207 and conventional needle valve member 217 to their downward positions to end the injection event. It should be appreciated that injection via HCCI nozzle outlets 226 is not preferable during the conventional injection event. Therefore, the various hydraulic surfaces and biasing spring forces should be such that fuel forces exerted on conventional needle valve member 207 will cause it to lift before HCCI needle valve member 217 is capable of lifting on its own. In addition, it should be appreciated that HCCI closing hydraulic surface 206 should be exposed to high pressure prior to exposure of conventional closing hydraulic surface 216 to high pressure, such that HCCI needle valve member 207 will return to its downward position concurrently with conventional needle valve member 217.

Once the conventional injection event is ended, the various remaining components of fuel injector 30 reset themselves in preparation for the next injection event. Second electrical actuator 42 is de-energized such that conventional needle control chamber 212 is once again connected to high pressure. In addition, high pressure acting in spool cavity 56, as a result of the de-activation of first electrical actuator 32, allows spool valve member 55 to once again be hydraulically balanced and returned to its upward, biased position under the force of biasing spring 60. Actuation fluid passage 68 is open to low pressure passage 52, and piston 80 and plunger 83 return to their retracted positions in a manner similar to that described for the previous embodiment.

III. FIGS. 6-7

Referring now to FIGS. 6 and 7, operation of this embodiment of the present invention will be described for a mixed mode injection event. If engine 10 is operating under a low load condition, fuel injector 230 will preferably operate in an HCCI mode, performing only an HCCI injection event during the compression stroke of piston 26. If engine 10 is operating under a high load condition, fuel injector 230 will preferably operate in a conventional mode, performing only a conventional injection event during the compression stroke of piston 26.

Prior to an injection event, low pressure prevails in fuel injector 230 and piston 280 and plunger 283 are in their retracted positions. First electrical actuator 232 and second electrical actuator 242 are de-energized, such that spool cavity 256 is open to high pressure and spool valve member 255 is hydraulically balanced and held in its upward, retracted position by biasing spring 260. Additionally, high pressure is acting on closing hydraulic surface 306 of HCCI needle valve member 307, and holding the same in its downward, closed position.

Just prior to the desired start of the HCCI injection event, when piston 26 is returning from its bottom dead center position, first electrical actuator 232 is energized. Low pressure now acts on spool valve member 255, such that spool valve member 255 is no longer hydraulically balanced. Spool valve member 255 then moves to its second position exposing hydraulic surface 281 of piston 280 to high pressure. Second electrical actuator 242 is also energized to open needle control chamber 302 to low pressure. However, HCCI needle valve member 307 remains in its closed position at this point under the force of biasing spring 301.

With high pressure now acting on hydraulic surface 281, piston 280 and plunger 283 begin to move toward their advanced positions. Because HCCI nozzle outlet 326 is still closed, piston 280 and plunger 283 advance only a slight distance. However, piston 280 and plunger 283 do travel a sufficient distance to raise the pressure of fuel within fuel pressurization chamber 285, nozzle supply passages 318, 308 and nozzle chamber 309 to injection pressure. When fuel pressure within nozzle chamber 309 is sufficient to overcome the downward force of biasing spring 301, needle valve member 307 is lifted to its upward position opening HCCI nozzle outlet 326 to commence fuel spray into cylinder 25 via HCCI nozzle outlet 326. Recall that the HCCI valve opening pressure of needle valve member 307 is lower than the conventional valve opening pressure of needle valve member 317, thus only HCCI needle valve member 307 will open at this time.

Fuel injection via HCCI nozzle outlets 326 occurs when piston 26 is still relatively far from its top dead center position. Fuel spray into cylinder 25 is in a first spray pattern with respect to cylinder centerline 27. This first spray pattern corresponds to fuel spray at a relatively small angle, here zero degrees, with respect to cylinder centerline 27. When the desired amount of fuel has been injected via HCCI nozzle outlet 326, first electrical actuator 232 is de-energized. Closing hydraulic surface 306 is again exposed to high pressure in needle control chamber 302. With high pressure now acting on closing hydraulic surface 306, HCCI needle valve member 307 is returned to its downward, closed position blocking HCCI nozzle outlet 326 and ending the injection event. Piston 280 and plunger 283 stop their downward movement, but do not retract as a result of continued high pressure acting on hydraulic surface 281. Because the HCCI injection event resulted in injection of only a small amount of fuel, corresponding to plunger 283 traveling less than a full stroke, a sufficient amount of fuel remains in fuel injector 230 to perform another injection event. It should be appreciated that these components could be allowed to reset if ample time is available before the next injection event. Further, recall that HCCI needle valve member 307 will return to its closed position, even with relatively high pressure fuel acting on opening hydraulic surface 310 due to the relative size and strength of closing hydraulic surface 306 and biasing spring 301.

After the HCCI injection event, piston 26 continues moving toward its top dead center position. The fuel that was injected during the HCCI injection event is mixing with air that was drawn into cylinder 25 during the intake stroke of piston 26 via the intake valve (not shown). As piston 26 approaches its top dead center position, fuel injector 230 prepares for the conventional injection event. Electrical actuator 232 is again energized to initiate downward movement of piston 280 and plunger 283. Actuator 242 remains de-energized to maintain high fluid pressure on closing hydraulic surface 306 of needle 307. Once the pressure of fuel within nozzle chamber 319 reaches a conventional valve opening pressure, conventional needle valve member 317 is raised to its upward, open position, and fuel spray into cylinder 25 via conventional nozzle outlets 328 can commence. Note that because high pressure is still acting on closing hydraulic surface 306 of HCCI needle valve member 307, HCCI needle valve member 307 remains in its downward position with respect to conventional needle valve member 317. In other words, while HCCI needle valve member 307 is moved upward by the upward movement of conventional needle valve member 317, valve surface 321 remains in contact with valve seat 322, and therefore, HCCI nozzle outlet 326 remains blocked from nozzle supply passage 308.

Recall that fuel spray via conventional nozzle outlets 328 occurs in a second spray pattern with respect to cylinder centerline 27 (FIG. 1b). This second spray pattern is at a relatively large angle with respect to cylinder centerline 27. When the desired amount of fuel has been injected from conventional nozzle outlets 326, first electrical actuator 232 is de-energized. Spool valve member 255 is returned to its first position to expose hydraulic surface 281 to low pressure. Piston 280 and plunger 283 once again end their advancing movement, but do not immediately return to their retracted positions as a result of residual high pressure acting on hydraulic surface 231. With piston 280 and plunger 283 no longer advancing, fuel pressure in nozzle supply passage 318 and nozzle chamber 319 begins to drop. When fuel pressure in nozzle chamber 319 falls below a valve closing pressure, conventional needle valve member 317 is returned to its closed position to end the conventional injection event.

Once the conventional injection event has ended the various components of fuel injector 230 and engine 10 again reset themselves in preparation for the next fuel injection event. Piston 280 and plunger 283 return to their retracted positions and fuel is drawn into fuel injector 230 as a result of the retracting movement of plunger 283. If the operating condition of engine 10 changes, fuel injector 230 could instead operate in either an HCCI mode or a conventional mode for the subsequent injection event.

IV. FIGS. 8-9

Referring now to the FIGS. 8 and 9 embodiment of the present invention, operation of fuel injector 330 will be described for a mixed mode injection event. As with the previous embodiment, it should be appreciated that fuel injector 330 could instead be operating in an HCCI mode or a conventional mode, such as in a low engine load condition or a high engine load condition, respectively.

Just prior to an injection event, HCCI needle valve member 407 and conventional needle valve member 417 are in their downward positions closing HCCI nozzle outlet 426 and conventional nozzle outlets 428, respectively. To initiate an injection event, first electrical actuator 332 is energized such that pressure acting on a control surface of spool valve member 355 is now low. Spool valve member 355 moves to its second position exposing hydraulic surface 381 to high pressure actuation fluid. High pressure acting on hydraulic surface 381 causes piston 380 to begin to move toward its advanced position. As piston 380 advances, plunger 383 moves in a corresponding manner. It should be appreciated that because HCCI nozzle outlet 426 is still closed, piston 380 and plunger 383 only advance a small distance at this time. However, this advancing movement of piston 380 and plunger 383 is sufficient to pressurize the fuel within fuel injector 330 to injection levels.

When fuel pressure in nozzle supply passage 408 exceeds the downward pressure exerted on needle valve member 407 by biasing spring 401, needle valve member 307 is lifted to its upward position to open HCCI nozzle outlet 426 to nozzle supply passage 408 via nozzle supply passage 405. It should be appreciated that the HCCI valve opening pressure required to lift HCCI needle valve member 407 to its open position is preferably less than the force that would be required to lift conventional needle valve member 417 against the downward force of both biasing spring 411 and the hydraulic force acting on closing hydraulic surface 416. Thus, conventional needle valve member 417 remains in its closed position at this time. Recall that this HCCI injection event occurs as piston 26 is still relatively far from its top dead center position. Fuel spray for this HCCI injection event occurs in a first spray pattern with respect to cylinder centerline 27 (FIG. 1a). This first spray pattern corresponds to a relatively small spray angle, here zero degrees, with respect to cylinder centerline 27.

When the desired amount of fuel has been injected, first electrical actuator 332 is de-energized and spool valve member 355 is returned to its first position. Hydraulic surface 381 is once again exposed to low pressure and piston 380 and plunger 383 stop their advancing movement. However, residual high pressure acting on hydraulic surface 381 prevents them from immediately returning to their retracted positions. While piston 380 and plunger 383 are ending downward movement toward their advanced positions, pressure within nuzzle supply passage 408 begins to decrease. When fuel pressure in nozzle supply passage 408 no longer exceeds the downward pressure exerted by biasing spring 401, needle valve member 407 is returned to its downward, closed position blocking HCCI nozzle outlet 426 from nozzle supply passage 408 and ending the HCCI injection event.

After the HCCI injection event, piston 26 continues moving toward its top dead center position. Fuel within cylinder 25 mixes with air to create a homogeneous mixture. At this time, various components of fuel injector 330 reset themselves in preparation for the conventional injection event, assuming that sufficient time is available. Fuel for the next injection event is either already in the injector, or drawn into fuel injector 330 by the retracting movement of plunger 383.

As piston 26 approaches its top dead center position, and just prior to the start of the conventional injection event, second electrical actuator 342 is energized. Low pressure actuation fluid is now acting on closing hydraulic surface 416 of conventional needle valve member 417. However, conventional needle valve member 417 remains in its closed position under the force of biasing spring 411. First electrical actuator 332 is re-energized and spool valve member 355 begins to move toward its second position. Hydraulic surface 381 is once again open to high pressure actuation fluid and piston 380 and plunger 383 again begin to move toward their advanced positions to pressurize fuel within fuel injector 330. Once fuel pressure acting on opening hydraulic surface 420 in nozzle supply passage 408 exceeds a conventional valve opening pressure, needle valve member 417 is moved to its upward position to open conventional nozzle outlets 428. HCCI needle valve member 407 is lifted with conventional needle valve member 417, however HCCI nozzle outlet 426 remains closed because valve surface 421 does not open valve seat 422. Recall that this is due to conventional valve opening pressure being less than the HCCI valve opening pressure when low pressure is acting on closing hydraulic surface 416. In addition, recall that once needle valve member 417 reaches is upward position, sleeve 406 prevents needle valve member 407 from further upward movement. Thus, fuel spray via conventional nozzle outlets 428 commences while fuel spray via HCCI nozzle outlet 426 is prevented. Recall that this conventional fuel injection event occurs when piston 26 is relatively close to its top dead center position and results in fuel spray into cylinder 25 in a second spray pattern (FIG. 1b). This second spray pattern is at a relatively large angle with respect to cylinder centerline 27, as illustrated.

When the desired amount of fuel has been injected by fuel injector 330 via conventional nozzle outlets 428, first electrical actuator 332 and second electrical actuator 342 are de-energized. With high pressure now acting on closing hydraulic surface 416 in needle control chamber 412, needle valve member 417 returns to its downward position, blocking conventional nozzle outlets 428 and ending the injection event. Once the injection event is over, the various components of fuel injector 330 begin to reset themselves in preparation for the next injection event. Piston 380 and plunger 383 return to their retracted positions and fuel for the subsequent injection event is drawn into fuel injector 330 with the retracting movement of plunger 383. In addition, engine 10 prepares for the subsequent fuel injection event as well. Piston 26 performs its power stroke, as a result of combustion within cylinder 25 following the conventional injection event, and then undergoes its exhaust and intake strokes, in a conventional manner. Electronic control module 17 evaluates the operation condition of engine 10 to determine a desired mode of operation for fuel injector 330 during the subsequent injection event.

V. FIGS. 10-11

Referring now to the FIGS. 10 and 11 embodiment of the present invention, operation of fuel injector 430 will be described for a mixed mode fuel injection event. It should be appreciated that this embodiment of the present invention can perform a mixed mode injection event at any desired operating condition. As with the previous embodiment, preferably only an HCCI injection will be performed when engine 10 is operating under a low load conditions.

Just prior to the desired start of the HCCI injection event, when piston 26 is relatively far from its top dead center position, actuator 442 is energized. Closing hydraulic surface 506 of needle valve member 507 is now exposed to low pressure actuation fluid in needle control chamber 502. With high pressure no longer holding needle valve member 507 in its downward position, the pressure of fuel within nozzle supply passage 508 and nozzle chamber 509, while being at medium fuel transfer pressure, is sufficient to lift needle valve member 507 to its upward position. Fuel can now spray out of fuel injector 430 via HCCI nozzle outlets 526. As fuel spray is occurring, fresh fuel is being drawn into fuel injector 430 via a fuel inlet.

Recall that fuel spray via HCCI nozzle outlets 526 will occur in a first spray pattern with respect to cylinder centerline 27 (FIG. 1a). This first spray pattern corresponds to a relatively small spray angle with respect to cylinder centerline 27. When the desired amount of fuel has been injected via HCCI nozzle outlets 526, second electrical actuator 442 is de-energized, and high pressure actuation fluid can once again act on closing hydraulic surface 506. Needle valve member 507 is then returned to its downward, closed position, and fuel injection via HCCI nozzle outlets 526 is ended.

As cylinder piston 26 advances toward its top dead center position, the fuel within cylinder 25 mixes with the air contained therein to create a homogeneous mixture. Concurrently, fuel injector 430 prepares for the conventional injection event. Just prior to the desired start of fuel injection, first electrical actuator 432 is energized and spool valve member 455 is moved to its second position exposing hydraulic surface 481 of piston 480 to high pressure actuation fluid. Piston 480 and plunger 483 thus begin to advance to pressurize fuel within fuel injector 430. When the pressure of fuel within nozzle chamber 519 is sufficient to overcome the force of biasing spring 511 and the high pressure force acting on closing hydraulic surface 506 of needle valve member 507, needle valve member 517 is lifted to its upward position. Fuel spray via conventional nozzle outlets 528 can now commence. However, with high pressure is still acting on closing hydraulic surface 506, needle valve member 507 will remain in its downward position with respect to needle valve member 517, such that valve surface 521 continues to close valve seat 522 as a result of the differing valve opening pressures of the two needle valve members, which is preferably due to appropriate sizing of the various hydraulic surfaces and biasing strengths of the respective biasing springs. Thus, HCCI nozzle outlets 526 will remain closed during the conventional injection event.

Fuel spray via conventional nozzle outlets 528 occurs in a second spray pattern with respect to cylinder centerline 27 (FIG. 1b). This second spray pattern corresponds to a relatively large spray angle with respect to cylinder centerline 27. When the desired amount of fuel has been injected via conventional nozzle outlets 528, first electrical actuator 432 is de-energized and spool valve member 455 is returned to its first position. With high pressure no longer acting on hydraulic surface 481, piston 480 and plunger 483 end their advancing movement. Fuel pressure within nozzle chamber 519 then begins to drop, such that it is no longer sufficient to overcome the force of biasing spring 511 and the hydraulic force acting on closing hydraulic surface 516. Needle valve member 517 then returns to its downward, closed position under the force of biasing spring 511. In addition, needle valve member 507 moves to its corresponding downward position under the hydraulic force exerted on closing hydraulic surface 506.

Between injection events, the various components of fuel injector 430 reset themselves for the next injection event. Piston 480 and plunger 483 return to their retracted positions and fuel for the subsequent injection event is drawn into fuel injector 430 with the retracting movement of these components. In addition, engine 10 prepares for the subsequent fuel injection event as well. Piston 26 performs its power stroke, as a result of combustion within cylinder 25 following the conventional injection event, and then undergoes its exhaust and intake strokes, in a conventional manner. Electronic control module 17 evaluates the operation condition of engine 10 to determine a desired mode of operation for fuel injector 430 during the subsequent injection event.

VI. FIGS. 12-15

Referring now to the FIGS. 12 and 13 embodiment of the present invention, prior to an injection event, low pressure prevails in fuel injector 530. As with previous embodiments, operation of fuel injector 530 will be described for a mixed mode injection event, corresponding to mixed mode operation of fuel injector 530. However, it should be appreciated that if engine 10 is operating in a different condition, fuel injector 530 might operate in an HCCI mode, performing only an HCCI injection event during the engine cycle. Similarly, if engine 10 is operating in still another condition, fuel injector 530 will preferably operate in a conventional mode, performing only a conventional injection event during the engine cycle.

Prior to an injection event, first electrical actuator 532 and second electrical actuator 542 are de-energized and HCCI needle valve member 607 and conventional needle valve member 617 are in their downward positions blocking fuel injection from HCCI nozzle outlets 626 and conventional nozzle outlets 628, respectively. Just prior to a desired injection event, first electrical actuator 532 is energized and a control surface of spool valve member 555 is exposed to low pressure. Spool valve member 555 now moves to a position exposing hydraulic surface 581 of piston 580 to high pressure. Piston 580 and plunger 583 begin to move toward their advanced positions. Because second electrical actuator 542 is still de-energized, fuel flow to HCCI nozzle supply passage 608 and conventional nozzle supply passage 618 is blocked and therefore piston 580 and plunger 583 can only advance a slight distance. However, this slight movement is sufficient to raise the pressure of fuel within fuel injector 530 to injection pressure.

To initiate the HCCI injection event, when piston 26 is relatively far from its top dead center position, second electrical actuator 542 is moved to its first position, opening nozzle supply passage 608 to pressurized fuel. As this pressurized fuel flows into nozzle chamber 609 via nozzle supply passage 608, it acts on opening hydraulic surface 610 of HCCI needle valve member 607 and lifts the same to its open position. Fuel spray into cylinder 25 via HCCI nozzle outlets 626 in a first spray pattern can now commence. Recall that this first spray pattern corresponds to a relatively small spray angle with respect to cylinder centerline 27 (FIG. 1a). When the desired amount of fuel has been injected, second electrical actuator 542 is de-energized, and nozzle supply passage 608 is again blocked. With pressurized fuel no longer acting on opening hydraulic surface 610, needle valve member 607 is returned to its downward, closed position to end the injection event under the force of biasing spring 601.

Just prior to the start of the conventional injection event, when cylinder piston 26 is relatively close to its top dead center position, second electrical actuator 542 is moved to its third position, opening nozzle supply passage 618. Pressurized fuel can now act on opening hydraulic surface 620 in nozzle chamber 619. Needle valve member 617 is now lifted to its open position, and fuel spray via conventional nozzle outlets 628 can commence in a second spray pattern. Recall that this second spray pattern corresponds to a relatively large spray angle with respect to cylinder centerline 27 (FIG. 1b).

To end the conventional injection event, second electrical actuator 542 is again de-energized and fuel flow to nozzle chamber 619 is ended. Conventional needle valve member 617 is then returned to its downward, closed position under the force of biasing spring 611. Fuel spray to cylinder 25 via conventional nozzle outlets 628 is thus ended. First electrical actuator 532 is then de-energized, and spool valve member 555 is returned to is first position exposing hydraulic surface 581 to low pressure. Those skilled in the art will also recognize that injection events can also be ended by de-energizing actuator 532 while actuator 542 remains energized. Piston 580 and plunger 583 end their advancing movement. Between injection events, the various components of fuel injector 530 once again begin to reset themselves in preparation for the subsequent injection event. Piston 580 and plunger 583 return to their retracted positions while drawing fresh fuel injector fuel injector 530 for the next injection event. In addition, engine 10 prepares for the subsequent fuel injection event as well. Piston 26 performs its combustion stroke, as a result of combustion within cylinder 25 following the conventional injection event, and then undergoes its exhaust and intake strokes. Electronic control module 17 evaluates the operation condition of engine 10 to determine the desired mode of operation for fuel injector 530 during the subsequent injection event.

Referring now to the FIG. 14 embodiment of the present invention, fuel injection via conventional nozzle outlets 628 is similar to that in the FIG. 14 embodiment. However, in this embodiment, the HCCI injection event is controlled by fuel rail pressure via second electrical actuator 542'. The HCCI injection event is initiated when piston 26 is still relatively far from its top dead center position. To initiate the HCCI injection event, second electrical actuator 542' is activated and HCCI nozzle chamber 609 is opened to a medium pressure fuel rail (not shown). The fuel acting on opening hydraulic surface 610 of HCCI needle valve member 607 is at a medium level, however, it is sufficient to overcome the downward bias of biasing spring 601. HCCI needle valve member 607 is then lifted and fuel spray into cylinder 25 via HCCI nozzle outlets 626 can commence in a first spray pattern. Recall that this first spray pattern corresponds to a relatively small spray angle with respect to cylinder centerline 27 (FIG. 1a). When the desired amount of fuel has been injected via HCCI nozzle outlets 626, second electrical actuator 542' is de-energized and the fuel rail is again blocked from HCCI nozzle chamber 609. HCCI needle valve member 607 is then returned to its downward position under the force of biasing spring 601, and the HCCI injection event is ended.

Just prior to the desired start of the conventional injection event, when piston 26 is relatively close to its top dead center position, first electrical actuator 532 is energized and spool valve member 555 is moved to its second position exposing hydraulic surface 581 of piston 580 to high pressure. Piston 580 and plunger 583 now begin moving toward their advanced positions. While these components can only move a slight distance because conventional nozzle outlets 628 remain blocked, this movement is sufficient to raise the pressure of fuel within fuel injector 530 to injection pressure. When the pressure of fuel in nozzle chamber 619 exceeds the downward force of biasing spring 611, conventional needle valve member 617 is lifted to its upward position. Fuel spray into cylinder 25 via conventional nozzle outlets 628 can commence in a second spray pattern. Recall that this second spray pattern corresponds to a relatively large spray angle with respect to cylinder centerline 27 (FIG. 1).

When the desired amount of fuel has been injected via conventional nozzle outlets 628, first electrical actuator 532 is de-energized. Spool valve member 555 is now returned to its first position exposing hydraulic surface 581 to low pressure. Piston 580 and plunger 583 end their downward movement, but do not immediately start their retracting movement as a result of residual high pressure exposed to hydraulic surface 581. Once the pressure of fuel acting on opening hydraulic surface 620 falls below the force of biasing spring 611, conventional needle valve member 617 is returned to its downward position to end fuel spray via conventional nozzle outlets 628. Engine 10 prepares for the subsequent fuel injection event as well. Piston 26 performs its combustion stroke, as a result of combustion within cylinder 25 following the conventional injection event, and then undergoes its exhaust and intake strokes. Electronic control module 17 evaluates the operation condition of engine 10 to determine the desired mode of operation for fuel injector 530 during the subsequent injection event.

Referring now to the FIG. 15 embodiment of the present invention, recall that the HCCI injection event is carried out in a manner similar to that disclosed for the FIG. 14 embodiment. Therefore, only the conventional injection event will be described. Just prior to the desired start of the conventional injection event, first electrical actuator 532 is energized and spool valve member 555 is moved to its second position exposing hydraulic surface 581 of piston 580 to high pressure actuation fluid. Piston 580 and plunger 583 now move toward their advanced positions, pressurizing fuel in fuel injector 530". In addition, activation of first electrical actuator 532 also results in conventional needle control chamber 612 being blocked from high pressure and being fluidly connected to low pressure reservoir 12. With low pressure acting on closing hydraulic surface 616, fuel pressure acting on opening hydraulic surface 620 is now sufficient to lift conventional needle valve member 617 to its upward position. Fuel spray via conventional nozzle outlets 628 can now commence in the second spray pattern, as described for the FIG. 14 embodiment.

When the desired amount of fuel has been injected via conventional nozzle outlets 628, first electrical actuator 532 is de-energized. Closing hydraulic surface 616 is once again exposed to high pressure in needle control chamber 612. The downward force acting on conventional needle valve member 617 is now sufficient to return conventional needle valve member 617 to its downward, closed position. With conventional nozzle outlets 628 now blocked, piston 580 and plunger 583 end their downward movement. At about the same time, spool valve member 555 is returned to its first position exposing hydraulic surface 581 to low pressure. Between injection events, piston 580 and plunger 583 return to their retracted positions. The retracting movement of plunger 583 draws fuel into fuel injector 530" for the next injection event. In addition, engine 10 prepares for the subsequent fuel injection event as well. Piston 26 performs its power stroke, as a result of combustion within cylinder 25 following the conventional injection event, and then undergoes its exhaust and intake strokes in a conventional manner. Electronic control module 17 evaluates the operation condition of engine 10 to determine the desired mode of operation for fuel injector 530 during the subsequent injection event.

VII. FIGS. 16-18

Referring now to FIGS. 16-18, operation of fuel injector 630 will now be described for a mixed mode injection event. Prior to the injection event, first electrical actuator 632 and second electrical actuator 642 are de-energized and spool valve member is positioned to expose hydraulic surface 681 of piston 680 to low pressure actuation fluid. Needle valve member 707 is in its downward, closed position out of contact with slop component 670. In addition, low pressure fuel is acting on hydraulic surface 669 of stop component 670 such that stop component 670 is in its biased, retracted position. Just prior to the desired start of the HCCI injection event, while piston 26 is relatively close to the bottom dead center position of its compression stroke, first electrical actuator 632 is energized.

Once first electrical actuator 632 is energized, closing hydraulic surface 706 is exposed to low pressure in needle control chamber 702 via pressure communication passage 688. In addition, spool valve member 655 is moved to its second position exposing hydraulic surface 681 of piston 680 to high pressure actuation fluid. Piston 680 and plunger 683 now begin to advance to pressurize fuel within fuel injector 630. However, because HCCI nozzle outlet 726 and conventional nozzle outlets 728 remain closed at this time, piston 680 and plunger 683 advance only a slight distance. However, this slight advance is sufficient to raise the pressure of fuel within fuel pressurization chamber 685 and nozzle supply passage 708 to injection pressures. Once the fuel pressure acting on opening hydraulic surface 710 exceeds the downward bias of biasing spring 701, needle valve member 707 is moved to its maximum lift position, in contact with stop component 670, thus allowing fuel spray into cylinder 25 via HCCI nozzle outlets 726 in a first spray pattern (see FIG. 18b). Recall that this first spray pattern corresponds to a relatively small spray angle with respect to cylinder centerline 27 (FIG. 1a). In addition, as needle valve member 707 is moving toward its maximum lift position, conventional nozzle outlets 728 are briefly opened by annulus 711, thus producing a short fuel spray via conventional nozzle outlets 728 into cylinder 25.

When the desired amount of fuel has been injected via HCCI nozzle outlets 726, first electrical actuator 632 is energized and hydraulic surface 706 is exposed to high pressure in needle control chamber 702. The pressure in needle control chamber 702 along with the force of biasing spring 701 move needle valve member 707 to its advanced closed position.

If a conventional injection event is desired, both actuators 632 and 642 are energized. Energization of actuator 632 acts to pressurize fuel in injector 630 as previously described. Energization of actuator 642 connect fluid transfer passage 672 to high pressure actuation fluid to produce a high pressure force on surface 669 of stop component 670. This causes stop component to move downward against the action of spring 673. When fuel pressure exceeds the value opening pressure, needle valve member 707 will lift into contact with stop component 670 to assume its intermediate position as shown in FIG. 18c.

Needle valve member 707 is now moved to its intermediate position, still in contact with stop component 670, blocking HCCI nozzle outlets 726 and opening conventional nozzle outlets 728 via annulus 711. Fuel spray into cylinder 25 via conventional nozzle outlets 728 can now commence in a second spray pattern. Recall that this second spray pattern corresponds to a relatively large spray angle with respect to cylinder centerline 27 (FIG. 1b). When the desired amount of fuel has been injected via conventional nozzle outlets 728, first electrical actuator 632 is de-energized. Pressure communication passage 688 is once again open to high pressure actuation fluid. With high pressure again acting on closing hydraulic surface 706, needle valve member 707 is returned to its downward, closed position to end the injection event. Once the injection event has ended, various components of fuel injector 630 reset themselves for the next injection event. After fuel pressure drops, actuator 642 can be de-energized. With conventional nozzle outlets 728 closed, piston 680 and plunger 683 end their advancing movement. However, they do not immediately begin to retract as a result of residual high pressure acting on hydraulic surface 681. With hydraulic surface 669 again exposed to low pressure in stop control chamber 671, stop component 670 can once again return to its retracted position under the force of biasing spring 673.

It should be appreciated that a number of modifications could be made to fuel injector 630 without departing from the spirit of this invention. For instance, second electrical actuator 642 could be eliminated, and fuel pressure in stop control chamber 671 could be controlled by a fuel supply passage that is a portion of nozzle supply passage 708. In that instance, stop component 670 would remain in its upward position until fuel pressure within stop control chamber 671 is increased to a sufficient level to overcome the force of biasing spring 673. At that point, stop component 670 would be moved to its advanced position, thus moving needle valve 700 to its intermediate position. In addition, stop component 670 could be modified such that biasing spring 673 biases stop component 650 to its downward position. In that instance, fluid transfer passage 672 could be a portion of nozzle supply passage 708 and could fluidly connect a stop control chamber 671 located below a shoulder portion of stop component 670. Here the high fluid pressure would act against the force of biasing spring to keep stop component 670 in its upward position while injector 630 was undergoing its HCCI injection event. As the pressure within stop control chamber 671 decreases over the injection event, the force of biasing spring 673 becomes sufficient to overcome the force of fuel in stop control chamber 671. Once that fluid pressure force could be overcome, stop component 670 would be moved to its downward position under the force of biasing spring 673, thus moving needle valve member 700 downward to its intermediate position. It should be appreciated that both of these alternative embodiments require the adjustment of fuel pressure over time during the injection event. In the first instance, fuel pressure must be able to increase over the injection event to allow the conventional injection event to occur. In the second instance, fuel pressure must be able to decrease over the injection event for the conventional injection event to occur. In addition to these modifications, it should be appreciated that stop component 670 need not be included in a fuel injector that has mixed mode capabilities. Rather, stop component 670 could be included in any nozzle assembly having a valve member that is movable to three positions.

It should be appreciated that a number of additional modifications could be made to the present invention, in addition to those illustrated and described herein. For instance, while only a hydraulically actuated fuel injector has been illustrated, it should be appreciated that a cam driven fuel injector could also benefit from use of the present invention. For instance, a fuel injector operating in conjunction with a two lobed cam could be modified to include any of the embodiment of the nozzle assembly described above. In addition, the nozzle assembly of the present invention could also be incorporated into a pump and line fuel injector. With minor modifications to the injector plumbing, the pump and line fuel injector could also operate as a dual mode fuel injector according to the present invention. For instance, while the present invention has been illustrated in the context of a hydraulically actuated fuel injector using oil as the actuation fluid, one skilled in the art will recognize that this invention is equally applicable to other fuel systems such as the single fluid amplifier piston common rail system (APCRS) illustrated in the paper "Heavy Duty Diesel Engines—The Potential of Injection Rate Shaping for Optimizing Emissions and Fuel Consumption", presented by Messrs. Bernd Mahr, Manfred Dumholz, Wilhelm Polach and Hermann Grieshaber; Robert Bosch GmbH, Stuttgart, Germany, at the 21$^{st}$ International Engine Symposium, May 4-5, 2000, Vienna, Austria. With some minor modifications, the Bosch APCRS system could be made in accordance with the present invention.

Those skilled in the art will recognize that all of the disclosed embodiments include a plurality of assembled components that define homogenous charge nozzle outlets and conventional nozzle outlets. These outlets may be defined by one or more body components, be defined by a needle valve member, or possibly be defined by a space between a body component and a valve member. With regard to the latter, a nozzle outlet according to the present invention could be an annular opening between an outwardly opening pin valve member and a body component. In addition, in all embodiments the homogenous charge and conventional nozzle outlets have different spray patterns.

It should be understood that the above description is intended for illustrative purposes only, and is not intended to limit the scope of the present invention in any way. For instance, while each of the fuel injectors have been illustrated having two separate actuators that are attached to the injector body, this is not necessary. One alternative to this would be the use of actuators positioned in the fluid lines that are not attached to the injector body. Further, these actuators could be either linear or rotary actuators. Thus, those skilled in the art will appreciate that other aspects, objects and advantages of this invention can be obtained from a study of the drawings, the disclosure and the appended claims.

What is claimed is:

1. A nozzle assembly comprising:

a plurality of assembled components having a centerline and defining a plurality of nozzle outlets;

a homogenous charge compression ignition portion of said plurality of nozzle outlets including at least one nozzle outlet oriented at a first angle with respect to said centerline;

a conventional portion of said plurality of nozzle outlets including at least one nozzle outlet oriented at a second angle with respect to said centerline;

said assembled components including a needle valve being positioned to move between positions that open and close said plurality of nuzzle outlets, and being moveable between a first position in which said first portion are open but said second portion are closed, and a second position in which said second portion are open but said first portion are closed; and at least one electrical actuator operably coupled to said needle valve said needle valve including a first needle valve member with a first closing hydraulic surface and a second needle valve member with a second closing hydraulic surface; and said first closing hydraulic surface is exposed to fluid pressure in a first needle control chamber and said second closing hydraulic surface is exposed to fluid pressure in a second needle control chamber said first needle control chamber contains a first fluid and said second needle control chamber contains a second fluid that is different from said first fluid.

2. The nozzle assembly of claim 1 wherein said first angle is relatively small and said second angle is relatively large.

3. The nozzle assembly of claim 2 wherein said first angle is less than or equal to 30 degrees; and said second angle is greater than or equal to 60 degrees.

4. The nozzle assembly of claim 1 wherein said second needle valve member is at least partially positioned within said first needle valve member.

5. The nozzle assembly of claim 4 wherein said first needle valve member includes a valve seat and said second needle valve member includes a valve surface;

a nozzle supply passage being blocked when said valve surface is in contact with said valve seat; and said nozzle supply passage being open when said valve surface is out of contact with said valve seat.

6. The nozzle assembly of claim 1 wherein a nozzle body includes a first valve seat and a second valve seat; and a number of said plurality of nozzle outlets are located between said first valve seat and said second valve seat.

7. The nozzle assembly of claim 1 wherein said needle valve includes a solitary needle valve member; and said needle valve member defines a portion of at least one nozzle supply passage.

8. The nozzle assembly of claim 7 wherein said needle valve is movable to a first position in which said first portion of said plurality of nozzle outlets and said second portion of said plurality of nozzle outlets are blocked;

said needle valve is movable to a second position in which said first portion of said plurality of nozzle outlets is open; and said needle valve being movable to a third position in which said second portion of said plurality of nozzle outlets is open.

9. The nozzle assembly of claim 1 wherein said homogenous charge portion and said conventional portion are mutually exclusive.

10. An engine having at least two modes of operation comprising:

an engine housing defining a plurality of cylinders;

a solitary fuel injector for each of said plurality of cylinders, each said fuel injector having *at least one electrical actuator and including* a tip at least partially positioned in one of said plurality of cylinders;

each said fuel injector having a first configuration for a homogeneous charge compression ignition mode of operation in which fuel is injected relatively early in a compression stroke when a piston is nearer a bottom dead center position than a top dead center position in a first spray pattern with a relatively small average angle to an injector centerline; and each said fuel injector having a second configuration for a conventional mode of operation in which fuel is injected relatively late in a compression stroke when said piston is nearer said top dead center position than said bottom dead center position in a second spray pattern with a relatively large average angle to said injector centerline.

11. The engine of claim 10 wherein each said fuel injector includes a plurality of nozzle outlets disposed therein;

a first portion of said plurality of nozzle outlets being open when said fuel injector is in said first configuration; and a second portion of said plurality of nozzle outlets being open when said fuel injector is in said second configuration.

12. The engine of claim 11 wherein each said fuel injector includes a needle valve that is biased toward a first position blocking said plurality of nozzle outlets;

said needle valve having a second position that opens said first portion of said plurality of nozzle outlets while blocking said second portion when said fuel injector is in said first configuration; and said needle valve having a third position that opens said second portion of said plurality of nozzle outlets while blocking said first portion when said fuel injector is in said second configuration.

13. The engine of claim 11 wherein each of said first portion of said plurality of nozzle outlets are oriented at first angles with respect to a centerline of said cylinder;

each of said second portion of said plurality of nozzle outlets are oriented at a second angles with respect to said centerline; and said first angles being different from said second angles.

14. The engine of claim 13 wherein said first angle is relatively small and said second angle is relatively large.

15. The engine of claim 14 wherein said first angle is less than or equal to 30 degrees; and said second angle is greater than or equal to 60 degrees.

16. The engine of claim 10 wherein said needle valve includes a first needle valve member and a second needle valve member; and

*the at least one electrical actuator includes* a first electrical actuator being operably coupled to said first needle valve member and a second electrical actuator being operably coupled to said second needle valve member.

17. The engine of claim 10 wherein said fuel injector includes a first needle valve member and a second needle valve member;

said first needle valve member includes a first closing hydraulic surface exposed to fluid pressure in a first needle control chamber; and said second needle valve member includes a second closing hydraulic surface exposed to fluid pressure in a second needle control chamber.

18. The engine of claim 17 wherein said first needle control chamber is fluidly isolated from said second needle control chamber.

19. The engine of claim 10 wherein said fuel injector includes a first needle valve member and a second needle valve member; and said second needle valve member is at least partially positioned within said first needle valve member.

20. The engine of claim 19 wherein said first needle valve member includes a valve seat, said second needle valve member includes a valve surface;

a nozzle supply passage being blocked when said valve surface is in contact with said valve seat; and said nozzle supply passage being open when said valve surface is out of contact with said valve seam.

21. The engine of claim 10 wherein said needle valve includes a solitary needle valve member; and said needle valve member defines a portion of at least one nozzle supply passage

22. The engine of claim 21 wherein said needle valve includes a stop component positioned in said injector body and movable between a retracted position and an advanced position;

said needle valve member is out of contact with said stop component when said needle valve is in a first position;

said needle valve member being in contact with said stop component when said needle valve is in a second position; and said needle valve member being in contact with said stop component when said needle valve is in a third position.

23. A method of operating an engine comprising the steps of:

providing an engine having an engine housing defining a plurality of engine cylinders, each of said engine cylinders including a piston;

positioning a solitary fuel injector for each of said plurality of engine cylinders, at least in part by positioning a tip of each said fuel injector at least partially within one of said engine cylinders;

if said fuel injector is operating in a homogeneous charge compression ignition mode, injecting fuel in a first spray pattern from said fuel injector when said piston is nearer a bottom dead center position than a top dead center position; and if said fuel injector is operating in a conventional mode, injecting fuel in a second spray pattern from said fuel injector when said piston is nearer to said top dead center position than said bottom dead center position*; and*

*at least one of the injecting steps includes energizing an electrical actuator of the fuel injector*.

24. The method of claim 23 wherein said step of injecting fuel when said piston is nearer a bottom dead center position includes a step of opening a first portion of fuel injector nozzle outlets; and said step of injecting fuel when said piston is nearer to said top dead center position includes a step of opening a second portion of said fuel injector nozzle outlets.

25. The method of claim 23 wherein said step of injecting fuel from said fuel injector when said piston is nearer a bottom dead center position includes a step of moving a needle valve from a first position to a second position; and said step of injecting fuel from said fuel injector when said piston is nearer to said top dead center position includes a step of moving said needle valve to a third position.

26. The method of claim 23 wherein said step of injecting fuel when said piston is nearer a bottom dead center position includes a step of injecting fuel in a first spray pattern with respect to a centerline of said cylinder; and said step of injecting fuel when said piston is nearer to said top dead center position includes a step of injecting fuel in a second spray pattern with respect to said centerline.

27. The method of claim 23 wherein said step of injecting fuel in a first spray pattern includes a step of injecting fuel at a relatively small average angle with respect to said centerline; and said step of injecting fuel in a second spray pattern includes a step of injecting fuel at a relatively large average angle with respect to said centerline.

28. The method of claim 23 including a step of closing at least one fuel injector nozzle outlet at least in part by applying high pressure to a closing hydraulic surface of a needle valve member movably positioned in said fuel injector.

29. The method of claim 23 including the steps of operating said fuel injector in said homogeneous charge compression ignition mode when said engine is operating in a low load condition; and operating said fuel injector in said conventional mode when said engine is operating in a high load condition.

30. The method of claim 23 including the step of operating said fuel injector in a mixed mode, at least in part by injecting fuel when said piston is relatively far from its top dead center position and injecting fuel when said piston is relatively close to its top dead center position in a same piston stroke.

31. A fuel injector comprising:

a plurality of assembled components having a centerline and defining a plurality of nozzle outlets;

a homogenous charge compression ignition portion of said plurality of nozzle outlets being oriented at a first average angle with respect to said centerline;

a conventional portion of said plurality of nozzle outlets being oriented at a second average angle with respect to said centerline;

said assembled components including at least one needle valve member being positioned adjacent said plurality of nozzle outlets;

said at least one needle valve member having a first position in which said homogenous charge portion is open but said conventional portion is closed, and a second position in which said conventional portion is open but said homogenous charge portion is closed;

said at least one needle valve member including a closing hydraulic surface exposed to fluid pressure in a needle control chamber;

*said assembled components including* at least one electrical actuator [attached to said injector body]; and

*said assembled components also including* a three-way needle control valve operably coupled to said electrical actuator, and being movable between a first position in which said needle control chamber is fluidly connected to a source of high pressure fluid but fluidly disconnected from a low pressure passage, and a second position in which said needle control chamber is fluidly connected to said low pressure passage but fluidly disconnected from said source of high pressure fluid.

32. The fuel injector of claim 31 wherein said first average angle is relatively small and said second average angle is relatively large.

33. The fuel injector of claim 32 wherein said first average angle is less than or equal to 30 degrees; and said second average angle is greater than or equal to 60 degrees.

34. The fuel injector of claim 33 wherein said needle valve includes a first needle valve member and a second needle valve member.

35. The fuel injector of claim 34 wherein said second needle valve member is at least partially positioned within said first needle valve member.

36. The fuel injector of claim 35 wherein said first needle valve member includes a valve seal, said second needle valve member includes a valve surface;

a nozzle supply passage being blocked when said valve surface is in contact with said valve seat; and said nozzle supply passage being open when said valve surface is out of contact with said valve seat.

37. The fuel injector of claim 36 wherein said first needle valve member includes a first closing hydraulic surface and said second needle valve member includes a second closing hydraulic surface; and said first closing hydraulic surface is exposed to fluid pressure in a first needle control chamber and said second closing hydraulic surface is exposed to fluid pressure in a second needle control chamber.

38. The fuel injector of claim 37 wherein said first needle control chamber is fluidly isolated from said second needle control chamber.

39. A fuel injector comprising:

a plurality of assembled components having a centerline and defining a plurality of nozzle outlets;

a homogenous charge compression ignition portion of said plurality of nozzle outlets being oriented at a first average angle with respect to said centerline;

a conventional portion of said plurality of nozzle outlets being oriented at a second average angle with respect to said centerline;

said assembled components including at least one needle valve member being positioned adjacent said plurality of nozzle outlets;

said at least one needle valve member having a first position in which said homogenous charge portion is open but said conventional portion is closed, and a second position in which said conventional portion is open but said homogenous charge portion is closed;

said at least one needle valve member including a first needle valve member with a first closing hydraulic surface exposed to fluid pressure in a first needle control chamber, and a second needle valve member with a second closing hydraulic surface exposed to fluid pressure in a second needle control chamber;

said first needle control chamber contains a first fluid and said second needle control chamber contains a second fluid that is different from said first fluid.

40. An engine having at least two modes of operation comprising:

an engine housing defining a plurality of cylinders;

at least one common rail attached to said engine housing;

a solitary fuel injector for each of said plurality of cylinders, each said fuel injector having a tip at least partially positioned in one of said plurality of cylinders, and including a plunger that partially defines a fuel pressurization chamber;

each said fuel injector being fluidly connected to said at least one common rail;

each said fuel injector having a first configuration corresponding to a homogeneous charge compression ignition mode of operation in which fuel is injected in a first spray pattern with a small average angle with respect to an injector centerline relatively early in a compression stroke when a piston is nearer a bottom dead center position than a top dead center position; and each said fuel injector having a second configuration corresponding to a conventional mode of operation in which fuel is injected in a second spray pattern with a large average angle with respect to said injector centerline relatively late in a compression stroke when said piston is nearer said top dead center position than said bottom dead center position.

41. The engine of claim 40 wherein each said fuel injector includes an injector body that defines a plurality of nozzle outlets:

a first portion of said plurality of nozzle outlets being open when said fuel injector is in said first configuration; and a second portion of said plurality of nozzle outlets being open when said fuel injector is in said second configuration.

42. The engine of claim 41 wherein each said fuel injector includes a needle valve that is biased toward a first position blocking said plurality of nozzle outlets;

said needle valve having a second position that opens said first portion of said plurality of nozzle outlets when said fuel injector is in said first configuration; and said needle valve having a third position that opens said second portion of said plurality of nozzle outlets when said fuel injector is in said second configuration.

43. The engine of claim 42 wherein said small average angle is less than or equal to 30 degrees; and said large average angle is greater than or equal to 60 degrees.

44. The engine of claim 43 wherein said needle valve includes a first needle valve member and a second needle valve member; and a first electrical actuator being operably coupled to said first needle valve member and a second electrical actuator being operably coupled to said second needle valve member.

45. The engine of claim 44 wherein said first needle valve member includes a first closing hydraulic surface exposed to fluid pressure in a first needle control chamber; and said second needle valve member includes a second closing hydraulic surface exposed to fluid pressure in a second needle control chamber.

46. The engine of claim 45 wherein said first needle control chamber is fluidly isolated from said second needle control chamber.

47. The engine of claim 46 wherein said first needle valve member is at least partially positioned within said second needle valve member.

48. The engine of claim 47 wherein said second needle valve member includes a valve scat, said first needle valve member includes a valve surface;

a nozzle supply passage being blocked when said valve surface is in contact with said valve seat; and said nozzle supply passage being open when said valve surface is out of contact with said valve seat.

49. The engine of claim 48 wherein said at least one common rail includes an amount of oil; and each said fuel injector includes a fuel inlet fluidly connected to a source of fuel that is different from said oil.

50. A method of operating an engine comprising:

providing an engine having an engine housing defining a plurality of engine cylinders, each of said engine cylinders including a piston;

positioning a solitary fuel injector for each of said plurality of engine cylinders, at least in part by positioning a tip of each of said solitary fuel injectors at least partially within one of said engine cylinders;

if said fuel injector is operating in a homogeneous charge compression ignition mode, injecting fuel in a first spray pattern from said fuel injector when said piston is nearer a bottom dead center position than a top dead center position;

if said fuel injector is operating in a conventional mode, injecting fuel in a second spray pattern from said fuel injector when said piston is nearer to said top dead center position than said bottom dead center position; [and]

applying high pressure to a closing hydraulic surface of at least one needle valve member movably positioned in said fuel injector*; and*

*at least one of the injecting steps includes energizing an electrical actuator of the fuel injector*.

51. The method of claim 50 wherein said step of injecting fuel when said piston is nearer a bottom dead center position includes a step of opening a first portion of fuel injector nozzle outlets; and said step of injecting fuel when said piston is nearer to said top dead center position includes a step of opening a second portion of said fuel injector nozzle outlets.

52. The method of claim 50 wherein said step of injecting fuel from said fuel injector when said piston is nearer a bottom dead center position includes a step of moving said at least one needle valve member from a first position to a second position; and said step of injecting fuel from said fuel injector when said piston is nearer to said top dead center position includes a step of moving said at least one needle valve member to a third position.

53. The method of claim 50 wherein said step of injecting fuel when said piston is nearer a bottom dead center position includes a step of injecting fuel in a first spray pattern with respect to a centerline of said cylinder; and said step of injecting fuel when said piston is nearer to said top dead center position includes a step of injecting fuel in a second spray pattern with respect to said centerline.

54. The method of claim 50 wherein said step of injecting fuel in a first spray pattern includes a step of injecting fuel at a relatively small angle with respect to said centerline; and said step of injecting fuel in a second spray pattern includes a step of injecting fuel at a relatively large angle with respect to said centerline.

55. The method of claim 50 including the steps of operating said fuel injector in said homogeneous charge compression ignition mode when said engine is operating in a low load condition; and operating said fuel injector in said conventional mode when said engine is operating in a high load condition.

56. The method of claim 50 including the step of operating said fuel injector in a mixed mode, at least in part by injecting fuel when said piston is nearer a bottom dead center position and injecting fuel when said piston is relatively close to its top dead center position in a same piston stroke.

57. A fuel injector comprising:

a plurality of assembled components having a centerline and defining a plurality of nozzle outlets;

a homogeneous charge subset of said plurality of nozzle outlets being oriented at a relatively small average angle with respect to said centerline;

a conventional subset of said plurality of nozzle outlets being oriented at a relatively large average angle with respect to said centerline;

said assembled components including at least one needle valve member movable between a first configuration in which said plurality of nozzle outlets are closed, a second configuration in which said homogeneous charge subset is open but said conventional subset is closed, and a third configuration in which said homogeneous charge subset is closed but said conventional subset is open;

said plurality of assembled components including a plunger that defines a portion of a fuel pressurization chamber that is fluidly connected to one of said homogeneous charge subset and said conventional subset when a portion of said plurality of nozzle outlets is open; and said plurality of assembled components including an electronically operated pressure control valve and at least one electronically operated needle control valve.

58. The fuel injector of claim 57 wherein said plurality of assembled components include an intensifier piston operably coupled to said plunger.

59. The fuel injector of claim 57 wherein said needle control valve includes a three-way valve member trapped to move between a first seat and a second seat.

60. The fuel injector of claim 57 wherein said homogeneous charge subset and said conventional subset are mutually exclusive.

61. The nozzle assembly of claim 1 wherein said homogeneous charge compression ignition portion of said plurality of nozzle outlets is separated from said conventional portion of said plurality of nozzle outlets by a sealing member; and said sealing member is continuously biased toward a position separating said homogeneous charge compression ignition portion of said plurality of nozzle outlets from said conventional portion of said plurality of nozzle outlets.

*62. A method of operating an engine, comprising the steps of:*

*injecting fuel from a fuel injector via a first at least one nozzle outlet in a first spray pattern directly into an engine cylinder;*

*mixing the fuel with air in the cylinder;*

*combusting the fuel after the mixing step;*

*injecting additional fuel from the fuel injector via a second at least one nozzle outlet in a second spray pattern directly into the engine cylinder when a piston of the engine cylinder is nearer top dead center than bottom dead center; and*

*at least one of the fuel injecting step and the additional fuel injecting step includes energizing at least one electrical actuator of the fuel injector.*

*63. The method of claim 62 wherein the first at least one nozzle outlet has a relatively small average angle with respect to a centerline; and*

*the at least one second nozzle outlet has a relatively large average angle with respect to the centerline.*

*64. The method of claim 62 wherein the at least one electrical actuator includes a first electrical actuator and a second electrical actuator;*

*the step of injecting fuel includes energizing the first electrical actuator; and*

*the step of injecting additional fuel includes energizing the second electrical actuator.*

*65. The method of claim 62 wherein the step of injecting fuel in the first spray pattern occurs during a compression stroke.*

*66. A nozzle assembly comprising: a plurality of assembled components defining a plurality of nozzle outlets;*

*a homogenous charge compression ignition portion of said plurality of assembled outlets being oriented at a first average angle with respect to a centerline;*

*a conventional portion of said plurality of nozzle outlets being oriented a second average angle with respect to said centerline;*

*said assembled components including a needle valve being positioned to move between positions that open and close said plurality of nozzle outlets, and being moveable between a first configuration in which said first portion are open but said second portion are closed, and a second configuration in which said second portion are open but said first portion are closed;*

*said assembled components also including at least one control valve member positioned to move between a high pressure seat and a low pressure seat; and*

*said assembled components further including at least one electrical actuator operably coupled to said needle valve via said at least one control valve member.*

*67. The nozzle assembly of claim 66 wherein said first average angle is relatively small and said second average angle is relatively large.*

*68. The nozzle assembly of claim 66 wherein at least one of a first needle valve member and a second needle valve member of the needle valve includes a closing hydraulic surface exposed to fluid pressure in a needle control chamber.*

*69. An engine having at least two modes of operation comprising: an engine housing defining a plurality of cylinders;*

*a solitary fuel injector for each of said plurality of cylinders, each said fuel injector having a tip at least partially positioned in one of said plurality of cylinders;*

*each said fuel injector having a first configuration for a homogeneous charge compression ignition mode of operation in which fuel is injected in a first spray pattern; and*

*each said fuel injector having a second configuration for a conventional mode of operation in which fuel is injected in a second spray pattern; and*

*each said fuel injector including at least one control valve member positioned to move between a high pressure seat and a low pressure seat.*

*70. A fuel injector comprising:*

*a plurality of assembly components having a centerline and defining a plurality of nozzle outlets;*

*a homogenous charge compression ignition portion of said plurality of nozzle outlets being oriented at a first average angle with respect to said centerline;*

*a conventional portion of said plurality of nozzle outlets being oriented at a second average angle with respect to said centerline;*

*said assembled components including at least one needle valve member being positioned adjacent said plurality of nozzle outlets;*

*said at least one needle valve member having a first position in which said homogenous charge portion is open but said conventional portion is closed, and a second position in which said conventional portion is open but said homogenous charge portion is closed;*

*said at least one needle valve member including a closing hydraulic surface exposed to fluid pressure in a needle control chamber;*

*said assembled components includes at least one control valve member positioned to move between a high pressure seat and a low pressure seat; and*

*said assembled components further includes at least one electrical actuator.*

* * * * *